(12) United States Patent
Gorecki

(10) Patent No.: US 7,386,053 B2
(45) Date of Patent: *Jun. 10, 2008

(54) SYSTEM AND METHOD OF EQUALIZATION OF HIGH SPEED SIGNALS

(75) Inventor: James Gorecki, Hillsboro, OR (US)

(73) Assignee: Synopsys, Inc, Mountain View, CA (US)

( * ) Notice: Subject to any disclaimer, the term of this patent is extended or adjusted under 35 U.S.C. 154(b) by 747 days.

This patent is subject to a terminal disclaimer.

(21) Appl. No.: 10/269,446

(22) Filed: Oct. 11, 2002

(65) Prior Publication Data

US 2004/0071203 A1 Apr. 15, 2004

(51) Int. Cl.
*H04L 27/00* (2006.01)

(52) U.S. Cl. .................. 375/259; 375/229; 375/230; 375/232; 375/219

(58) Field of Classification Search ............... 375/259, 375/229, 230, 232, 219
See application file for complete search history.

(56) References Cited

U.S. PATENT DOCUMENTS

| | | | | |
|---|---|---|---|---|
| 3,716,807 A | * | 2/1973 | Sha et al. ............... | 333/18 |
| 4,021,738 A | * | 5/1977 | Gitlin et al. ............. | 375/232 |
| 4,489,461 A | * | 12/1984 | Hasegawa et al. ........ | 19/258 |
| 2002/0141347 A1 | | 10/2002 | Harp et al. | |

FOREIGN PATENT DOCUMENTS

| | | |
|---|---|---|
| EP | 0 180 066 A2 | 5/1986 |
| EP | 1 229 698 A2 | 8/2002 |

OTHER PUBLICATIONS

R. Rad, C. Yang, M. Horowitz and T. Lee. "A 0.4-um CMOS 10-Gb/s 4-PAM Pre-Emphasis Serial Link Transmitter." IEEE Journal of Solid-State Circuits, vol. 34, No. 5, May 1999, pp. 580-585.
"IEEE 802.14 High-Capacity Physical Layer Specification, Draft 1 Revision 4." Prepared by IEEE 802.14a Hi-Phy Task Force. Institute of Electical Engineers, Inc., 345 E. 47th Street, New York, NY, 10017, USA, 1999. pp 1-81.

* cited by examiner

*Primary Examiner*—Ted Wang
(74) *Attorney, Agent, or Firm*—Park Vaughan & Fleming LLP

(57) ABSTRACT

In one aspect, the present invention is directed to a technique of, and system for enhancing the performance of high-speed digital communications through a communications channel, for example a backplane. In this aspect of the present invention, a transmitter includes equalization circuitry to compensate for bandwidth limitations and reflections in high-speed digital communication systems. In one embodiment, the equalization circuitry is designed, programmed and/or configured to introduce intersymbol interference in order to improve the signal integrity in high-speed communications and enhance the operation and performance of such systems. In this regard, the equalization circuitry includes temporally overlapping leading and/or trailing taps (relative to the data (symbol) signal) to reduce, minimize, mitigate or effectively eliminate pre-cursor and/or post-cursor intersymbol interference due to, for example, bandwidth limitations and reflections in high-speed digital communication systems. The amount of equalization may be programmed, adjusted or controlled by varying the positioning of the tap(s), varying the coefficients of the tap(s), and/or varying the pulse durations of the tap(s) (that is, the pulse duration of the equalization signal attributed to the tap).

18 Claims, 16 Drawing Sheets

$0 \leq y_1 \leq 1$ and/or $0 \leq x_1 \leq 1$

SYSTEM AND METHOD OF EQUALIZATION OF HIGH SPEED SIGNALS

BACKGROUND OF THE INVENTION

This invention relates to a system and method for providing high-speed digital communications through a communications channel, and more particularly to an equalizer for communications systems implemented in wired type environments, for example microstrip, stripline, printed circuit board (e.g., a backplane) and cable.

Communications systems are continuing to increase the rate at which data is transmitted between devices. The increase in data rate presents a challenge to maintain, enhance or optimize the ability to recover the transmitted signal and thereby the information contained therein. Thus, in general, increasing the rate of transfer of data tends to adversely impact the fidelity of the received signal.

For example, high-speed digital baseband communications systems often encounter debilitating signal reflections and signal dispersion as the rate of data transfer increases. Signal reflections are often due to mismatches of impedances between the impedances of the devices (whether the devices are connected in a point-to-point or bus configuration), and/or mismatches of the impedance of the communications channel and termination resistors.

Signal dispersion, also known as intersymbol interference, may be caused by bandwidth limitations of the communications channel. Dispersion in many situations is due to two primary effects, namely, dielectric loss and skin effect. The effects of dielectric loss are often limited or minimized in communications systems, for example, wired systems, through careful design of the conductor insulator.

In backplane environments, however, intersymbol interference caused by dielectric loss may be difficult to eliminate, or sufficiently or adequately limit or minimize. In this regard, dispersion of the transmitted signal may be observed in the time domain as a symmetric broadening of that signal. This broadening of the transmitted signal produces both pre-cursor (before the pulse peak of the signal) and post-cursor (after the pulse peak of the signal) intersymbol interference.

Dispersion effects attributable to skin-effect tend to be observed predominately as post-cursor intersymbol interference. Although the debilitating effects caused by skin-effect may not be dominant when compared to effects of dielectric loss, skin-effect may be a source of dispersion to be addressed at higher transmission rates.

In short, pre-cursor and/or post-cursor impairment, whether due to skin effect or dielectric loss, must be addressed as transmission rates increase.

With reference to FIGS. 1 and 2, conventional high speed digital baseband communications systems often employ circuitry, for example, a finite impulse response filter ("FIR filter"), in the receiver to equalize the transmitted signals in an effort to address, or compensate for the effects of dispersion and reflection of the transmitted signal and/or the sensitivity of the system to that distortion or reflection. Such circuitry typically includes a one or more taps having fixed or pre-programmed "positions" and coefficients. These taps are typically "trailer" or "trailing" taps and, as such, the equalization circuitry address only post-cursor signal distortion.

In pre-emphasis equalization implementations (i.e., equalization circuitry and techniques implemented in the transmitter), the equalization circuitry also includes "trailer" or "trailing" taps to provide an equalization signal that is produced after transmission of the information signal. The pre-emphasis equalization circuitry, like the equalization circuitry implemented in the receiver, is designed to address only post-cursor signal distortion.

For example, in the backplane environment, conventional communications systems employ an FIR filter having fixed or pre-programmed tap positions and coefficients in the transmitter. The taps are positioned to compensate for post cursor intersymbol interference.

Regardless of where the equalization circuitry is implemented, the duration of the equalization signal and the relative position or placement of the tap(s) of the equalization circuitry are selected or designed to avoid interference with the signal representative of the transmitted information. As such, at the transmitter, there is no temporal overlap between the equalization signal and the information signal. In this way, the equalization signal is less likely to interfere with the pulse peak of the transmitted signal (i.e., the symbol or data signal).

Thus, while conventional equalization techniques may address, or compensate for the effects of some of the bandwidth limitations and reflections in the system, the ability of such techniques to provide sufficient compensation for high-speed communications may be limited. Moreover, not only may the conventional techniques be unsuitable to provide adequate compensation for the debilitating affects on the integrity of the transmitted signal in high speed communication systems, but the operation and corresponding impact of conventional equalization circuitry may not be adjusted as the environment of those systems change (for example, due to changes in temperature, operating conditions, data rate, and device parametrics due to, for example, aging). That is, after design and manufacture, conventional equalization circuitry and techniques have limited flexibility when implemented within a particular environment or an environment that varies over time. This may severely limit the usefulness of such equalization circuitry and techniques when implemented in environments that change dramatically over time.

Notably, incorporating more complex equalization circuitry, for example, an FIR filter having many taps, tends to add cost, complexity and power consumption to a transmitter, receiver and/or transceiver. In addition, conventional pre-emphasis tends to suffer from over-equalization at the boundaries of the symbol (data signal) and may exhibit large parasitic capacitances thereby degrading the performance of the system. Such over-equalization may impact successive symbols or data signals, thereby contributing to the debilitating effects of signal reflections and dispersion. Accordingly, there is a tendency to implement equalization circuitry and techniques having a minimum of complexity and taps; however, such circuitry and techniques often are unable to provide sufficient compensation for high-speed communications systems.

Thus, there is a need for improved digital communications systems and techniques in order to enhance the performance of, for example, high-speed digital communication systems through a communications channel, for example a backplane. There is a need for improved equalization circuitry and techniques that are capable of compensating for bandwidth limitations and reflections, improving the signal integrity in high-speed communications, and overcoming many of the shortcomings of conventional circuitry and techniques.

SUMMARY OF THE INVENTION

In a first principal aspect, the present invention is directed to a technique of, and system for enhancing the performance of high-speed digital communications through a communications channel, for example a backplane. In one embodiment of this aspect of the present invention, a data communications system includes a transmitter having equalization circuitry to compensate for bandwidth limitations and reflections in high-speed digital communication systems. The equalization circuitry is designed, programmed and/or configured to introduce compensation that is ideally the inverse of the intersymbol interference caused by the communications channel in order to improve the signal integrity in high-speed communications and enhance the operation and performance of such systems. In this regard, the equalization circuitry may include leading and/or trailing taps to reduce, minimize, mitigate or effectively eliminate pre-cursor and/or post-cursor intersymbol interference due to, for example, bandwidth limitations and reflections in high-speed digital communication systems. The amount of intersymbol interference may be programmed, adjusted or controlled by varying the positioning of the tap(s), varying the coefficients of the tap(s), and/or varying the pulse durations of the tap(s) (that is, the pulse duration of the equalization signal attributed to the tap).

In a second principal aspect, the present invention is a system for providing data communication over a communications channel, wherein the communications channel includes a backplane. The system comprises a first transmitter and a first receiver, both coupled to the communications channel. The first transmitter includes equalization circuitry having at least one leading tap and at least one trailing tap wherein the at least one leading tap and the at least one trailing tap provide an equalization signals that temporally overlap with a data signal and wherein the transmitter outputs an equalized data signal. The taps of the equalization circuitry may include programmable coefficients, programmable positioning, and/or programmable pulse durations.

In one embodiment, the system further includes a back channel for transmitting information from the first receiver back to the first transmitter wherein the information is representative of the coefficients of the taps of the equalization circuitry in the first transmitter. The system may also include a second transmitter coupled, via a communications channel, to a second receiver. In this embodiment, the first receiver may calculate information which is representative of the equalization circuitry's coefficients (for example, intermittently or periodically) and the second transmitter may transmit that information to the second receiver. Thereafter, the information may be provided to the first transmitter for implementation by the equalization circuitry. The first transmitter may use the information to adjust, program, alter or vary the operation or response of the equalization circuitry.

In another embodiment, the taps of the equalization circuitry include programmable coefficients and wherein information which is representative of the programmable coefficients is provided to the system using an external interface.

It should be noted that the information provided via the back channel or external interface, for example, may be the actual positions of the tap(s), coefficients of the tap(s), and/or pulse durations of the tap(s). Alternatively, the information may be adjustments, modifications and/or changes to be made to the positions of the tap(s), the coefficients of the tap(s), and/or the pulse durations of the tap(s). Thus, information which is representative of the positions of the tap(s), the coefficients of the tap(s), and/or the pulse durations of the tap(s) is intended to define the actual positions (i.e., absolute values) of the tap(s), coefficients of the tap(s), and/or pulse durations of the tap(s), as well as information pertaining to adjustments, modifications and/or changes to be made to the positions (i.e., relative values) of the tap(s), the coefficients of the tap(s), and/or the pulse durations of the tap(s).

In another principal aspect, the present invention is a system for providing data communication over a communications channel, wherein the communications channel includes a backplane. The system of this aspect includes a first transmitter coupled to a first receiver via the communications channel. The first transmitter includes equalization circuitry having a first trailing tap that provides an equalization signal that temporally overlaps with a data signal, wherein the transmitter generates an equalized data signal using the equalization signal and the data signal. The first trailing tap may include a programmable coefficient, a programmable position, and/or a programmable pulse In one embodiment of this aspect of the present invention, the system further includes a back channel for transmitting information which is representative of the coefficient of the tap of the equalization circuitry to the transmitter. In this regard, the system may include a second transmitter coupled to a second receiver via the communications channel. The first receiver may calculate information which is representative of the coefficient (for example, periodically) and the second transmitter may transmit the information to the second receiver. The first transmitter may use the information to adjust, program, alter or vary the operation or response of the equalization circuitry In another embodiment, the equalization circuitry may also include a second trailing tap wherein the second trailing tap provides an equalization signal that temporally overlaps with a data signal. The transmitter may generate the equalized data signal using the equalization signals provided by the first and second trailing taps and the data signal.

In another embodiment, the equalization circuitry further includes a leading tap wherein the leading tap provides an equalization signal that temporally overlaps with a data signal. The transmitter may generate the equalized data signal using the equalization signal provided by the leading tap, the equalization signals provided by the first and second trailing taps, and the data signal.

In yet another principal aspect, the present invention is a method for equalization of data signals that are transmitted over a communications channel (for example, a backplane). The method may include generating a first equalization signal using a leading tap wherein the first equalization signal temporally overlaps with a data signal, generating a second equalization signal using a first trailing tap wherein the second equalization signal temporally overlaps with the data signal, and generating an equalized data signal using the first and second equalization signals with the data signal. The method may further include transmitting the equalized data signal.

The method of this aspect of the invention may further include generating a third equalization signal using a third trailing tap wherein the third equalization signal temporally overlaps with the data signal. In contrast, the method may include generating a third equalization signal using a third trailing tap wherein the third equalization signal does not temporally overlap with the data signal.

In one embodiment, the method may include controlling the first and/or second equalization signals by controlling the position of the trailing tap, the coefficient of the trailing tap and/or the duration of the tap.

In another embodiment, the method includes receiving the equalized data signal using a receiver, generating information which is representative of the coefficient of the trailing tap(s) (either absolute or relative information), and providing the information which is representative of the coefficient of the trailing tap to the transmitter to control, adjust or modify the coefficient of the trailing tap.

BRIEF DESCRIPTION OF THE DRAWINGS

In the course of the detailed description to follow, reference will be made to the attached drawings. These drawings show different aspects of the present invention and, where appropriate, reference numerals illustrating like structures, components, circuitry and/or elements in different figures are labeled similarly. It is understood that various combinations of the structures, components, circuitry and/or elements other than those specifically shown are contemplated and within the scope of the present invention.

DETAILED DESCRIPTION

Figure 1:
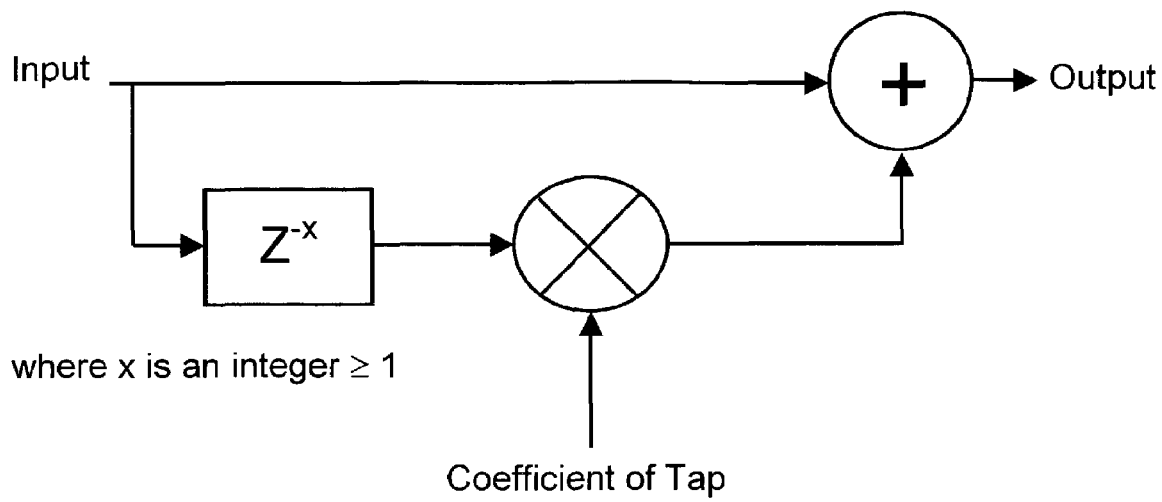
FIG. 1 is a block diagram representation of a pre-emphasis two-tap FIR filter topology.
Figure 2:
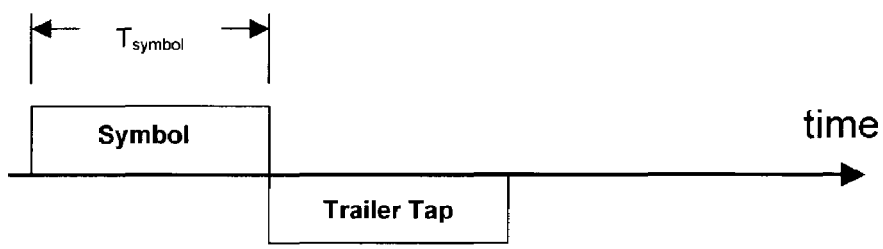
FIG. 2 is an illustration of the filter tap timing, in relation to the data signal ("Symbol"), according to the conventional two tap filter topology of FIG. 1.

The present invention is directed to a technique of, and system for enhancing the performance of high-speed digital communications through a communications channel, for example a backplane. In one embodiment of the present invention, a transmitter includes equalization circuitry and techniques to compensate for bandwidth limitations and reflections in high-speed digital communication systems. The circuitry and techniques of this embodiment is designed, programmed and/or configured to introduce intersymbol interference in order to improve the signal integrity in high-speed communications and enhance the operation and performance of such systems. The circuitry and techniques include leading and/or trailing taps to reduce, minimize, mitigate or effectively eliminate pre-cursor and/or post-cursor intersymbol interference due to, for example, bandwidth limitations and reflections in high-speed digital communication systems. In this way, the equalization circuitry and techniques may reduce, minimize or eliminate non optimum (e.g., over-equalization) at the boundaries of the data signal (i.e., the symbol).

Implementing the circuitry and techniques of the present invention in the transmitter may have an advantage in that the equalization effect may include an infinite impulse response (IIR) equalization component that is created by the impulse response of the communications channel. The leader and/or trailer taps of the equalization circuitry are adjustable "corrections" applied to the transmitted symbol. These "correction" pulses are dispersed along with the transmitted symbol by the impulse response of the communications channel. As such, the longer the channel's impulse response, the longer the correction pulses. This may reduce or minimize the number of taps required (over a time-sampled equalizer implemented at the receiver) to achieve a desired response and thereby improve or enhance the bandwidth of the transmitter output.

The circuitry and technique according to one embodiment of the present invention may include pre-emphasis implemented as an analog FIR filter having one or more taps positioned before and/or after the transmitted symbol. The taps are positioned to temporally overlap with the data signal to thereby introduced intersymbol interference. The amount of intersymbol interference may be programmed, adjusted or controlled by varying the positioning of the tap(s), varying the coefficients of the tap(s), and/or varying the pulse durations of the tap(s) (that is, the pulse duration of the equalization signal attributed to the tap).

In one aspect of the present invention, the positions of the tap(s), the coefficients of the tap(s), and/or the pulse durations of the tap(s) may be adjusted or controlled during operation of the transmitter. In this regard, the adjustment or control of the taps of the circuitry for equalization may be accomplished using an adaptive algorithm.

For example, tap weights or coefficients (values) may be determined or controlled in response to a conventional linear adaptive algorithm (for example, Least Mean Square, Recursive Least Square, and stochastic versions thereof) to provide enhanced or optimal reception (maximum eye-opening) at a receiver. In a preferred embodiment, a stochastic zero forcing algorithm may be employed to provide convergence (stochastic Least Mean Square). In this regard, the adaptive algorithm, uses samples of the received signal provided by the receiver to force the edges of the symbol pulse or data signal towards zero. Such an algorithm may have a robust convergence behavior.

In another embodiment, the adjustment or control of the taps of the equalization circuitry may be by the user via programming either before or during operation of the transmitter. In this regard, the user may provide information representative of the positions of the tap(s), the coefficients of the tap(s), and/or the pulse durations of the tap(s) in order to change, enhance or optimize the performance of the transmitter, receiver and/or the communications system. This information may be the actual positions of the tap(s), the coefficients of the tap(s) and/or the pulse durations of the tap(s). This information may also be adjustments, modifications and/or changes to be made to the positions of the tap(s), the coefficients of the tap(s), and/or the pulse durations of the tap(s). Such information may be provided directly to the transmitter (to be implemented within the equalization circuitry) or to a controller to distribute to the transmitter or set of transmitters.

In another embodiment, the positions of the tap(s), the coefficients of the tap(s), and/or the pulse durations of the tap(s) may be pre-programmed or pre-set, for example, by permanently, semi-permanently or temporarily (i.e., until re-programmed) storing information which is representative of the positions of the tap(s), the coefficients of the tap(s), and/or the pulse durations of the tap(s) in an SRAM, DRAM, ROM, PROM, EPROM, EEPROM or the like (e.g., configuring the state of a certain pin or pins on the package). In this embodiment of the present invention, the information representative of the positions of the tap(s), the coefficients of the tap(s) and/or the pulse durations of the tap(s) may be stored or in, for example an SRAM, DRAM, ROM or EEPROM. In this way, the transmitter may access the memory to retrieve the necessary information during start-up/power-up, initialization or re-initialization.

As mentioned above, the information which is representative of the positions of the tap(s), the coefficients of the tap(s), and/or the pulse durations of the tap(s) may be the actual positions of the tap(s), the coefficients of the tap(s) and/or the pulse durations of the tap(s). Alternatively, this information may also be adjustments, modifications and/or changes to be made to the positions of the tap(s), the coefficients of the tap(s), and/or the pulse durations of the tap(s).

It should be noted that the memory used to store the information representative of the positions of the tap(s), the coefficients of the tap(s) and/or the pulse durations of the tap(s) may be comprised of discrete component(s) or may reside on the integrated circuit containing the transmitter, receiver or transceiver.

In another embodiment, the pre-set or preprogrammed positions of the tap(s), the coefficients of the tap(s) and/or the pulse durations of the tap(s) may be fine-tuned to enhance the system performance. In this regard, after (or during) the performance of an initialization or re-initialization process, the system may implement fine adjustments to the predetermined positions of the tap(s), the coefficients of the tap(s) and/or the pulse durations of the tap(s). The fine adjustments may be accomplished or implemented by the user or by an adaptive algorithm as mentioned above. In this way, convergence may be obtained more rapidly and/or a less complex adaptive algorithm may be implemented.

It should be noted that all techniques for determining, calculating, setting, and/or resetting the positions of the tap(s), the coefficients of the tap(s) and/or the pulse durations of the tap(s) (i.e., the pulse duration of the equalization signal(s)), whether now known or later developed, are intended to be within the scope of the present invention.

Figure 3:
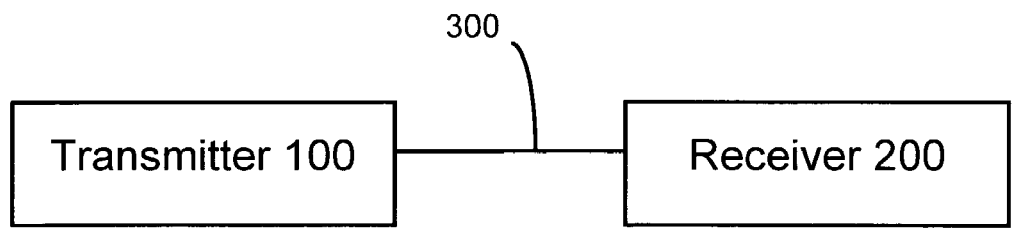
FIG. 3 is a block diagram representation of an exemplary communications system including a transmitter and a receiver.

With reference to FIG. 3, in one aspect, the present invention is a high-speed digital communication system 10 including transmitter 100 (having equalization circuitry) and receiver 200. Briefly, transmitter 100 is connected to receiver 200 via communications channel 300, for example, a backplane. In one embodiment, transmitter 100 encodes and transforms a digital representation of the data into electrical signals. The transmitter 100 also transmits the signals to receiver 200. The received signals, which may be distorted with respect to the signals transmitted into or onto communications channel 300 by transmitter 100, are processed and decoded by receiver 20Q to reconstruct a digital representation of the transmitted information.

Figure 4:
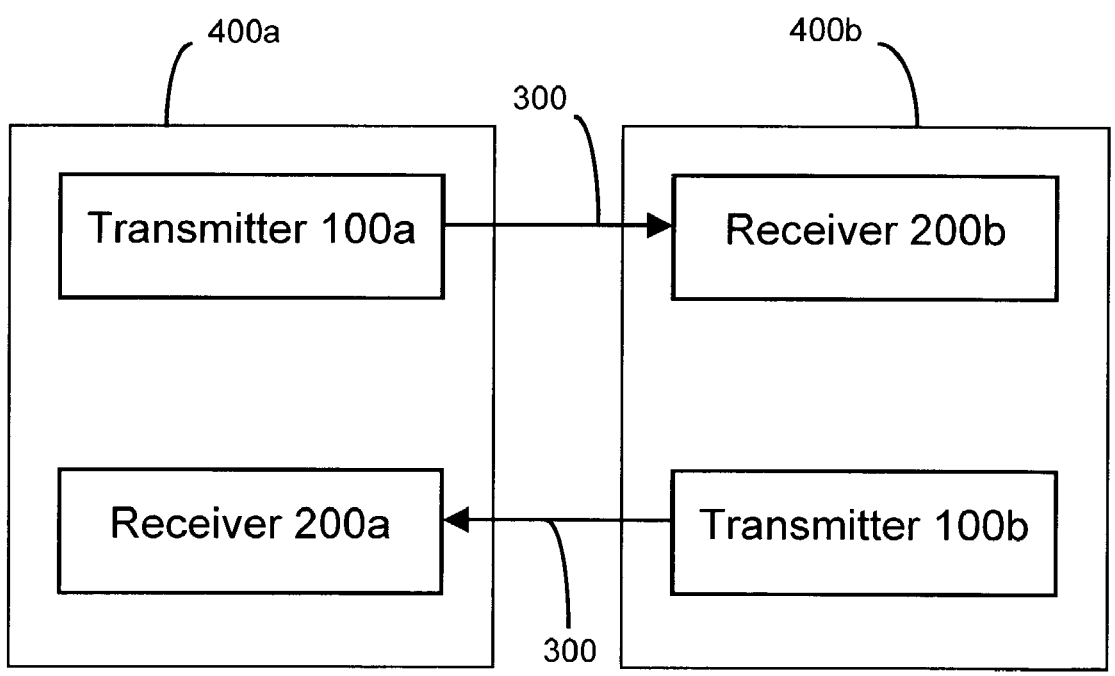
FIG. 4 is a block diagram representation of transmitter/receiver pairs of an exemplary communications system.

With reference to FIG. 4, the digital communication system 10 typically includes a plurality of transmitters and receivers. In this regard, communications system 10 includes a plurality of unidirectional transmitter and receiver pairs (transmitter 100a and receiver 200b; and transmitter 100b and receiver 200a). Transmitter 100a and receiver 200a may be incorporated into transceiver 400a (in the form of an integrated circuit). Similarly, transmitter 100b and receiver 200b are incorporated into transceiver 400b. From a system level perspective, there are a plurality of such transmitter/receiver pairs in simultaneous operation, for example, four, five, eight or ten transmitter/receiver pairs, communicating across communications channel 300. Thus, in operation, the transmitter and receiver pairs simultaneously transmit data across channel 300.

In one embodiment, transmitters 100 and receivers 200 employ a multilevel pulse amplitude modulated (PAM-n) communications technique. For example, transmitters 100 and receivers 200 may employ a PAM-4 signaling technique to send two bits of data through channel 300. That is, each transmitter/receiver pair may operate in the same manner to send two bits of data for each symbol transmitted through the channel 300.

In one embodiment, five successive symbols are associated with each eight-bit data byte. The additional overhead associated with this form of encoding may be used to ensure adequate symbol crossings, necessary for timing recovery and/or to provide DC balance. That overhead may also be used to transmit control information for controlling or modifying the operation of the adaptive or adjustable equalization circuitry in a transmitter.

Figure 10A:
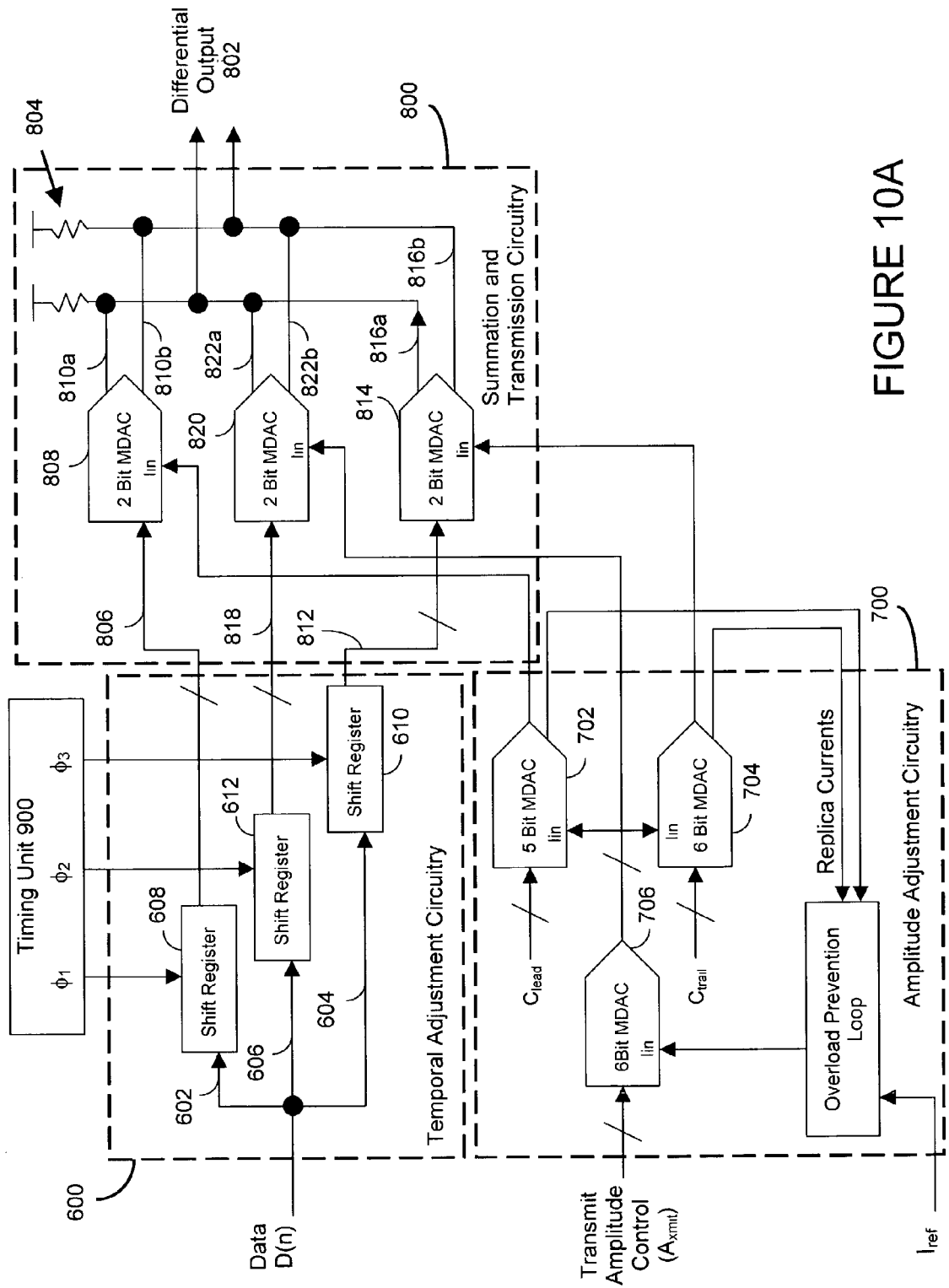
FIGS. 10A, 10B and 10C are detailed block diagram representations of a three tap transmit equalizer, in conjunction with additional transmitter circuitry, according to certain embodiments of the present invention.

It should be noted that although certain aspects of the present invention are described in the context of PAM-4 signaling techniques (for example, the multiplying digital to analog converters (MDACs) in FIG. 10A), the present invention may utilize other modulation formats that encode fewer or more bits per symbol codes based on other than byte wide user may be readily adapted or employed. Moreover, other communications mechanisms that use different encoding tables, other than four levels, or use other modulation mechanisms may also be used, for example, PAM-5, PAM-8, PAM-16, CAP, and wavelet modulation. In this regard, the techniques described herein are in fact applicable to any and all modulation schemes, including but not limited to, PAM-4 encoding described herein.

As mentioned above, in one embodiment, equalization circuitry is incorporated into each transmitter of a high-speed digital communication system. In this embodiment, the equalization circuitry incorporates leading and/or trailing taps to reduce, minimize, mitigate or effectively eliminate pre-cursor and/or post-cursor intersymbol interference due to, for example, bandwidth limitations and reflections in high-speed digital communication systems. The extent of equalization introduced by the circuitry, however, may vary between equalization circuitry of each transmitter in the high-speed digital communication system.

Figure 5A:
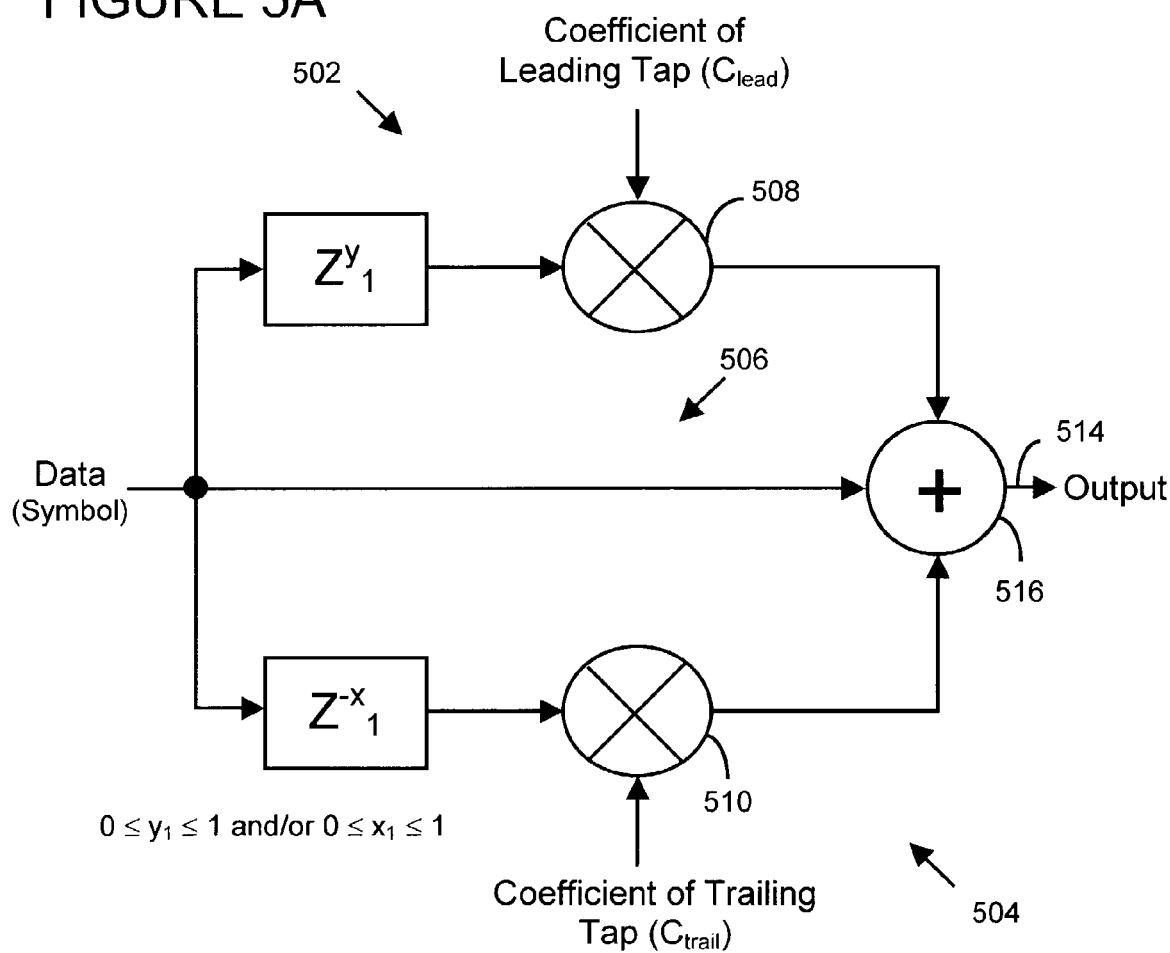
FIGS. 5A and 5B are block diagram representations of topologies of equalization circuitry in accordance with certain aspects of the present invention.

With reference to FIG. 5A, in one embodiment, equalization circuitry 500 may be characterized as an analog FIR filter having a basic topology including three taps, namely leading tap 502, trailing tap 504 and information, symbol or data tap 506. The leading and trailing taps 502 and 504, respectively, are designed and configured to introduce compensation that is ideally the inverse of the effects caused by the communications channel. The positioning of the taps, relative to the data or symbol tap 506, may be controlled, varied or adjusted to provide a desired or predetermined output. The positions of taps 502 and 504 are determined and/or adjusted by changing the values of $y_1$ and $x_1$, respectively.

The amplitude of the pre-cursor and post-cursor intersymbol interference is determined or controlled by the respective coefficients ($C_{lead}$ and $C_{trail}$). In particular, $C_{lead}$ determines the amplitude of the signal introduced in the leading tap and $C_{trail}$ determines the amplitude of the signal introduced in the trailing tap. A scaling operation is performed whereby the leading or trailing signals are "multiplied" by $C_{lead}$ and $C_{trail}$. This operation is represented by the multiplier symbol 508 and 510, respectively. Both $C_{lead}$ and $C_{trail}$ may be controlled, set and/or changed as described above.

A scaling operation may also be performed with respect to the symbol or data signal. In one embodiment, data or symbol is "multiplied" by $C_{symbol}$. It should be noted, however, that the coefficient $C_{symbol}$ is typically 1.

With continued reference to FIG. 5A, the output of the leading tap 502 and trailing tap 504 are combined, along with the output of data or symbol tap, via a summation operation (i.e., summation symbol 516) to produce an output signal 514. The output signal 514 is representative of the signal transmitted by the transmitter to the receiver.

Figure 6:
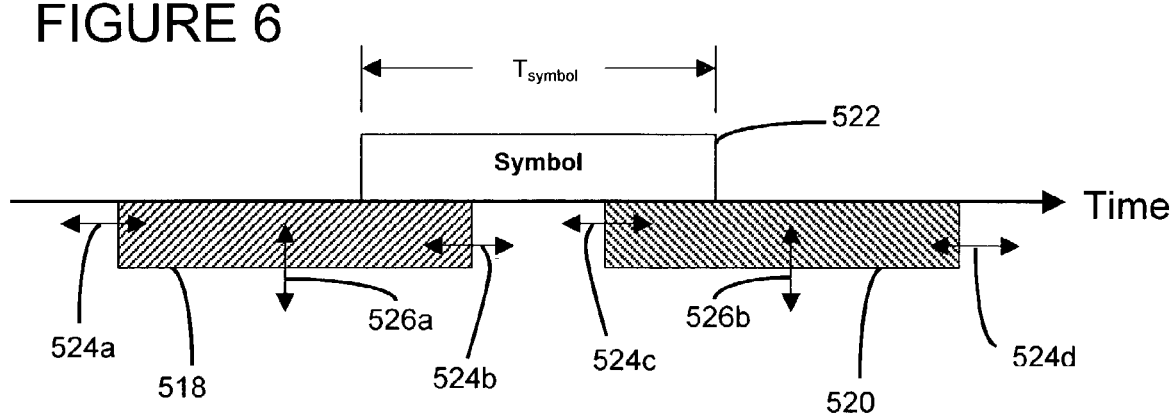
FIG. 6 is an illustration of the tap timing relationship, in relation to the data signal ("Symbol"), according to one aspect of the present invention.
Figure 7:
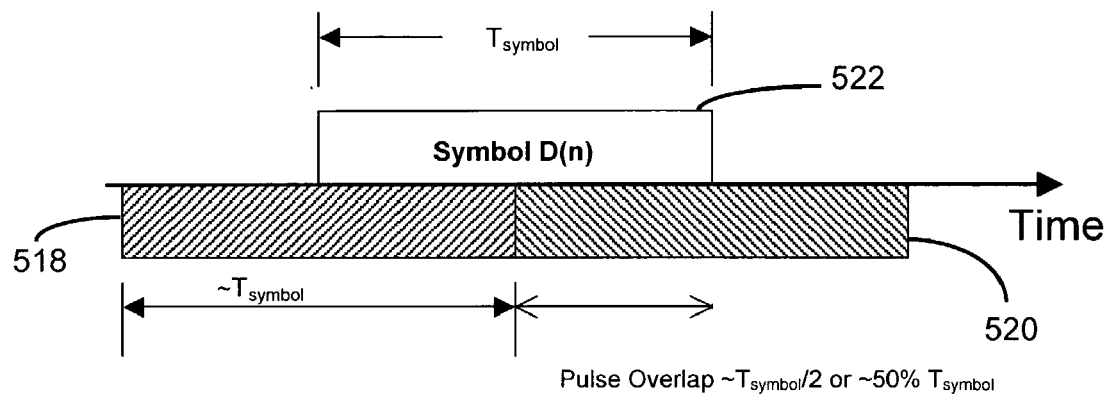
FIG. 7 is an illustration of the tap timing relationship, in relation to the data signal ("Symbol"), according to another embodiment of the present invention.

As mentioned above, the amount of equalization may be adjusted or controlled by altering the positioning of the tap(s), changing the coefficients of the taps, and/or varying the pulse durations of the tap(s). With reference to FIGS. 6 and 7 and continued reference to FIG. 5A, a change in the positioning of the taps will produce a change in the timing of signals 518 and 520 generated by the leading and trailing taps 502 and 504, respectively. The ability to change, vary or program the positions of the taps is illustrated by lines 524*a* and 524*b* (signal 518), and lines 524*c* and 524*d* (signal 520).

With continued reference to FIGS. 5A, 6 and 7, a change in the coefficients of the taps will produce signals 518 and 520 having larger or smaller amplitudes. The amplitude of equalization signal 518 (of leading tap 502) may be characterized as $D(n) \times C_{lead}$. The amplitude of equalization signal 520 (of trailing tap 504) may be characterized as $D(n) \times C_{trail}$. Lines 526*a* and 526*b* indicate the capability of changing, varying and/or programming the coefficients of the taps.

Changing the pulse duration of signals 518 and 520 will, among other things, increase or decrease the high frequency equalization. In this regard, the extent of high frequency equalization increases as the duration of the equalization signals 518 and 520 decrease. Under this circumstance, higher speed analog and digital circuitry may be necessary to implement the transmitter. It should be noted that the ability to change the pulse duration of the taps is also illustrated by lines 524*a* and 524*b* (leader equalization signal 518), and lines 524*c* and 524*d* (trailer equalization signal 520).

Figure 5B:
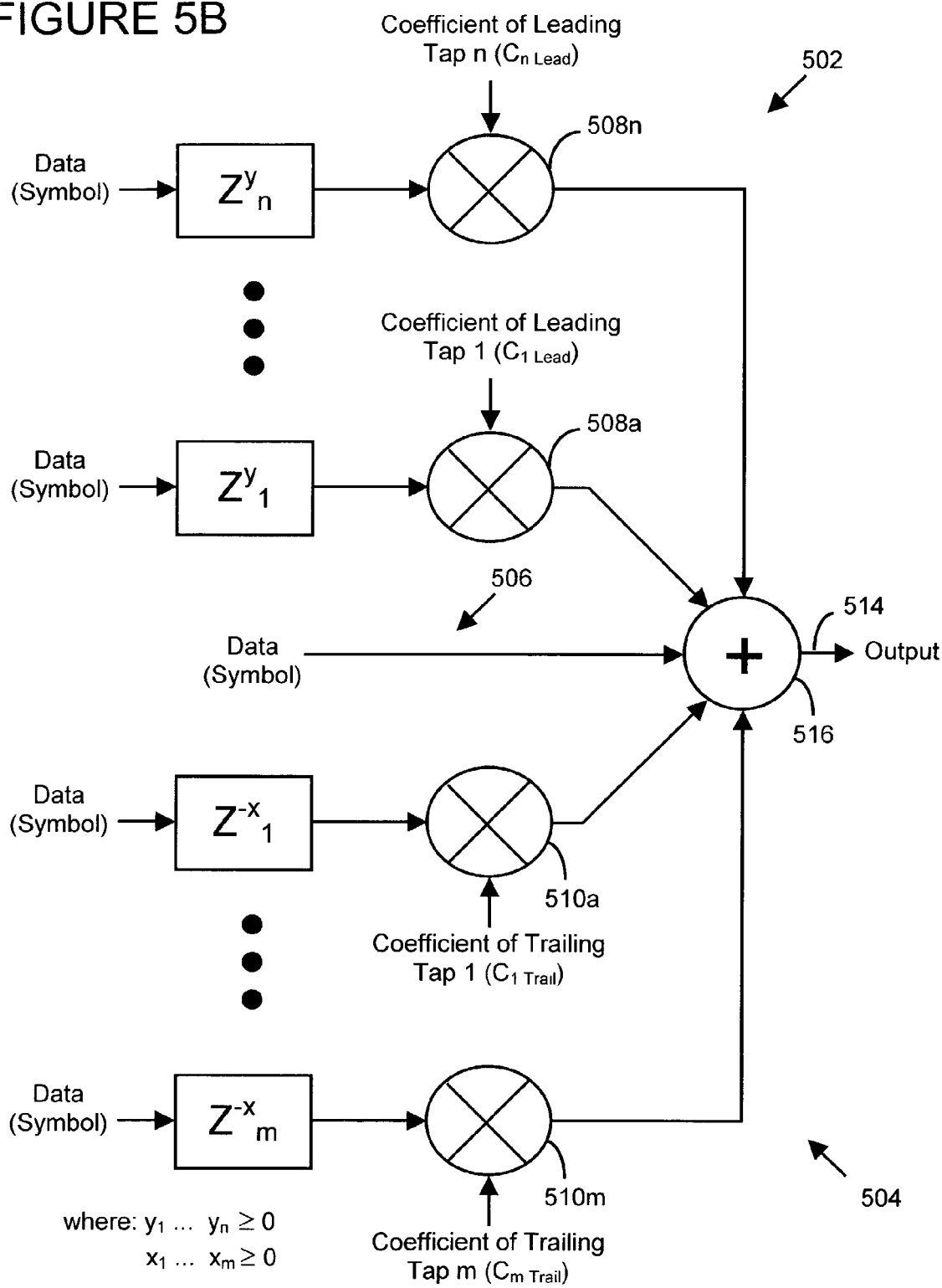

With reference to FIG. 5B, in another embodiment, the equalization circuitry 500 may include a plurality of leading taps 502 and/or a plurality of trailing taps 504. As described above, the extent of pre-cursor and post-cursor correction (i.e., intersymbol interference) may be adjusted or controlled by altering the positioning of the tap(s) of leading taps 502 and trailing taps 504, changing the coefficients of the taps of leading taps 502 and trailing taps 504, and/or varying the pulse durations of the tap(s) (that is, the pulse duration of the equalization signal attributed to the tap(s)) of the leading taps 502 and trailing taps 504.

It should be noted that a digital signal generator ((for example, a signal generator having a variable, controllable or programmable period)) may be employed to provide equalization signals having pulse durations and/or shapes that are different than the period and/or shape of the symbol. The digital signal generator may generate signals having different pulse widths and as such, equalization signals may have different widths and each may be different than the period of the symbol. The signal generator may supply the input(s) to the tap(s) of the leading tap(s) and/or the trailing taps.

It should be noted that there are other techniques for controlling, programming or adjusting the duration of equalization signals 518 and 520, as described below.

In one embodiment of the present invention, the positions of the tap(s), the coefficients of the tap(s), and/or the pulse durations of the tap(s) are adjusted or controlled during operation of the transmitter, for example using an adaptive algorithm, as described above. Moreover, the enhanced, suitable or optimum values of the positions of the tap(s), the coefficients of the tap(s), and/or the pulse durations of the equalization signal(s) may be determined by heuristic means to provide the range of equalization (after adaptation) for a given class of communication channels.

In another embodiment, the adjustment or control of the taps of the equalization circuitry may be user programmable (either before or during operation of the transmitter). The positions of the tap(s), the coefficients of the tap(s), and/or the pulse durations of the equalization signal(s) may, in another embodiment, be pre-programmed or pre-set, for example, by permanently, semi-permanently or temporarily (i.e., until re-programmed) storing information representative of the positions of the tap(s), the coefficients of the tap(s), and/or the pulse durations of the tap(s) in an SRAM, DRAM, ROM, PROM, EPROM, EEPROM or the like. The pre-programmed or pre-set positions of the tap(s), the coefficients of the tap(s) and/or the pulse durations of the tap(s) may thereafter be fine-tuned to enhance the system performance.

In those instances where the positions of the tap(s), the coefficients of the tap(s), and/or the pulse durations of the tap(s) are adjusted or controlled using an adaptive algorithm, a back channel may be advantageous to provide information to the equalization circuitry that resides in the transmitter. A back channel is a communication path and technique that facilitates providing information that is determined and/or generated by a receiver and used by the corresponding transmitter to adjust or modify output signal characteristics of that transmitter. Thus, with reference to FIG. 4, equalization circuitry that resides in transmitter 100*a* receives control or adaptation information that is determined and/or generated by receiver 200*b* via transmitter 100*b* and receiver 200*a*. Here, back channel is comprised of transmitter 100*b*, receiver 200*a*, and communications channel 300 that connects transmitter 100*b* to receiver 200*a*.

In one embodiment, the back channel forms a part of the user data channel. In this way, back channel data may be transmitted asynchronously at the same time user data is transmitted without reducing or significantly impacting the amount of channel communications capacity dedicated to user data. Thus, in one embodiment, back channel data is sent in a back channel data frame or data packet. The data frame may include a frame header, a set of data bits, a set of control bits, and a data frame trailer. The frame header is used to mark the beginning of a data frame to allow the transmitter and receiver to remain synchronized as to the proper beginning of the data frame. The set of data bits contains the data to be transmitted across the back channel and is distinguished from the set of control bits used to control the operation of the back channel as necessary. Finally, the data frame trailer is used to mark the end of a data frame to further allow the transmitter and receiver to remain synchronized as to the proper end of the data frame.

It should be noted that other message formats and features, such as error correction or detection, may be implemented in the back channel frame. Indeed, any and all formats, whether now known or later developed, are intended to be within the scope of the present invention. Moreover, it is possible to construct an arbitrarily complex frame for the back channel information and have the frame carried by the sub channel described herein.

It should be further noted that the information provided via the back channel may be the actual positions (absolute values) of the tap(s), coefficients of the tap(s), and/or pulse durations of the tap(s). Alternatively, the information may be adjustments, modifications and/or changes to be made to the positions (relative values) of the tap(s), the coefficients of the tap(s), and/or the pulse durations of the tap(s). Thus, information which is representative of the positions of the tap(s), the coefficients of the tap(s), and/or the pulse durations of the tap(s) is intended to define the actual positions of the tap(s), coefficients of the tap(s), and/or pulse durations of the tap(s), as well as information pertaining to adjustments, modifications and/or changes to be made to the positions of the tap(s), the coefficients of the tap(s), and/or the pulse durations of the tap(s).

With reference to FIGS. 5A and 7, the equalizer tap timing relationship where $y_1$ and $x_1$ are both equal to about ½ produces leading and trailing equalization signals 518 and 520 that encompass about the entire period of the symbol of information signal. The leading and trailing equalization signals 518 and 520, respectively, each temporally overlap symbol signal 522 by appropriately 50% of the period of symbol signal 522. Unlike a conventional equalization circuitry and techniques where the temporal overlap (at the transmitter) is 0%, the intersymbol interference may reduce or eliminate over-equalization at the symbol boundaries.

Figure 8:
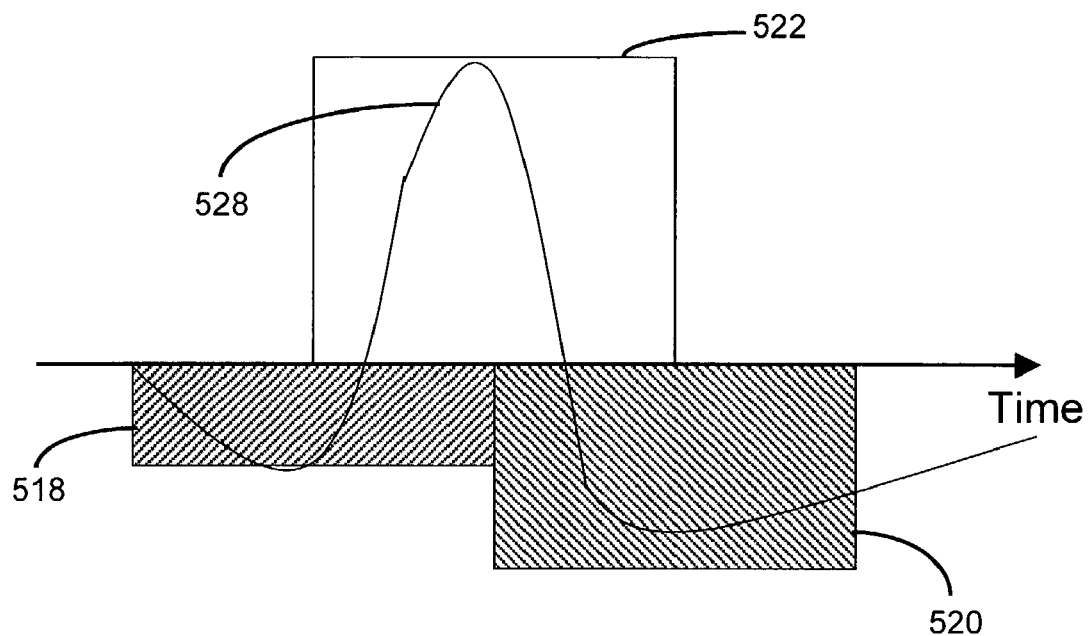
FIG. 8 is an illustration of an exemplary tap timing and amplitude relationship, in relation to the data signal and the resulting composite signal to be transmitted, according to one embodiment of the present invention.

As mentioned above, the output of equalization circuitry 500 may, as a practical matter, be determined adding leading and trailing equalization signals 518 and 520, respectively, and symbol signal 522. For example, where $y_1$ and $x_1$ are both equal to about ½, and the coefficients of the leading and trailing taps 502 and 504 produce equalization signals 518 and 520 as illustrated in FIG. 8, output signal 528 is produced. As the positions of the tap(s), the coefficients of the tap(s), and/or the pulse durations of the tap(s) vary, the shape and energy content of output signal 528 will change accordingly.

Figure 9A:
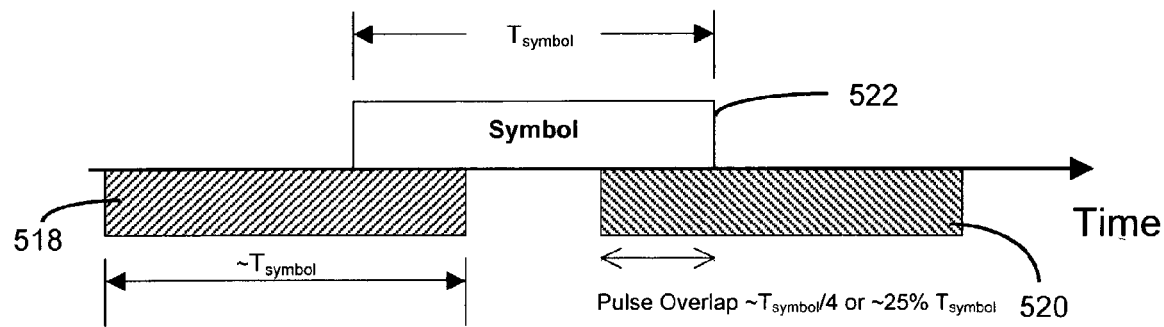
FIGS. 9A, 9B, 9C, 9D, 9E and 9F are illustrations of exemplary tap timing, amplitude (coefficient), and pulse width relationships, in relation to the data signal, according to certain aspects of the present invention.

For given environments, it may be advantageous to implement equalization circuitry according to the present invention that includes taps having certain or predetermined positions, coefficients, and pulse durations. The specific delays may be determined by heuristic means to provide the "best" range of equalization (after adaptation) for a class of communication channels. With reference to FIG. 9A, in one embodiment, the leading and trailing taps are arranged to provide an equalization (pulse) signal overlap of about 25% of the data signal (i.e., symbol).

Figure 9B:
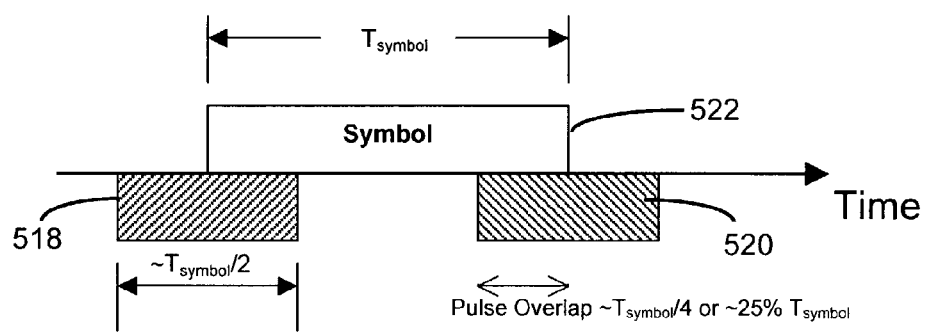

In another embodiment, the duration(s) or period(s) of the "taps" may be selected to be other than a full period of the symbol or data signal. With reference to FIG. 9B, the period or duration of the equalization signals is about ½ of the period of the symbol or data signal. This embodiment may enhance high frequency equalization relative to the equalization provided by FIGS. 7 and 9A. As such, a system implementing an equalization timing relationship are illustrated in FIG. 9B, may require higher speed analog and digital circuitry relative to the systems implementing FIGS. 7 and 9A.

Figure 9C:
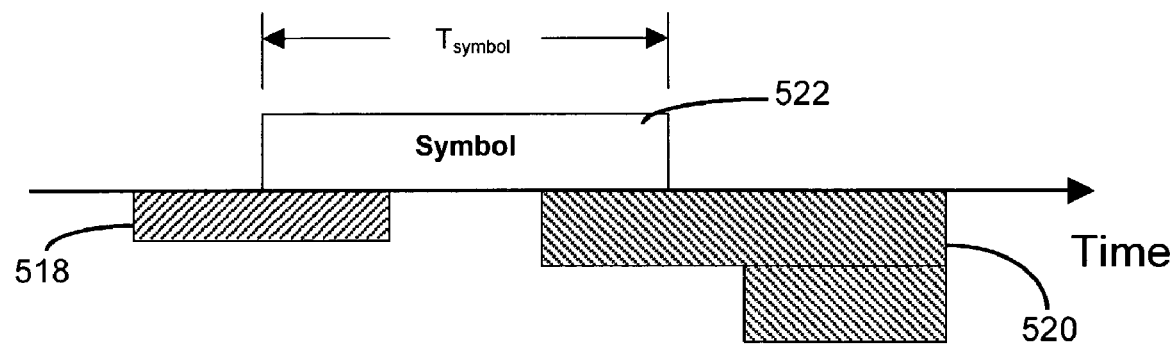
Figure 9D:
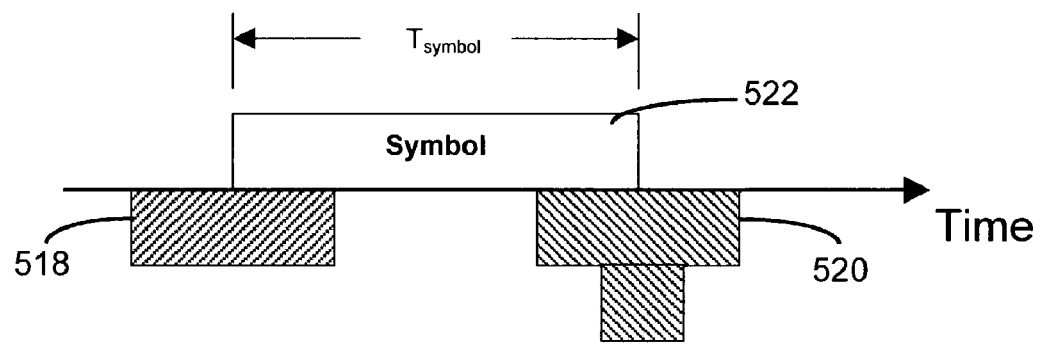
Figure 9E:
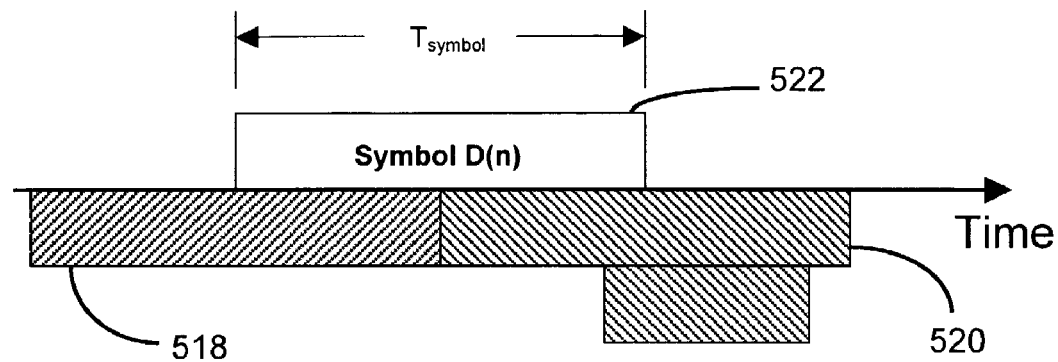

In addition, as mentioned above, the positions of the tap(s), the coefficients of the tap(s), and/or the pulse durations of the tap(s) determine the shape and energy content of output signal 528. Certain communications environments may require differing amounts of post-cursor and/or pre-cursor correction in order to provide a desired response, for example, as measured by the receiver. In one embodiment of the present invention, the trailing taps may include more than one tap each having a position, coefficient and/or pulse duration that produces a relative tap timing and amplitude to "correct" for a post-cursor distortion that is larger than pre-cursor distortion. With reference to FIGS. 9C, 9D and 9E, a second tap of trailing taps 504 may provide additional equalization signal to address this disproportionate distortion. The timing responses of FIGS. 9C, 9D and 9E may be generated, for example, using the topology of FIG. 5B.

Moreover, the taps of trailing taps 504 may have different positions, coefficients and/or pulse durations. In this way, the tap of trailing taps 504 may provide additional equalization signal to address distortions that vary greatly over time.

Figure 9F:
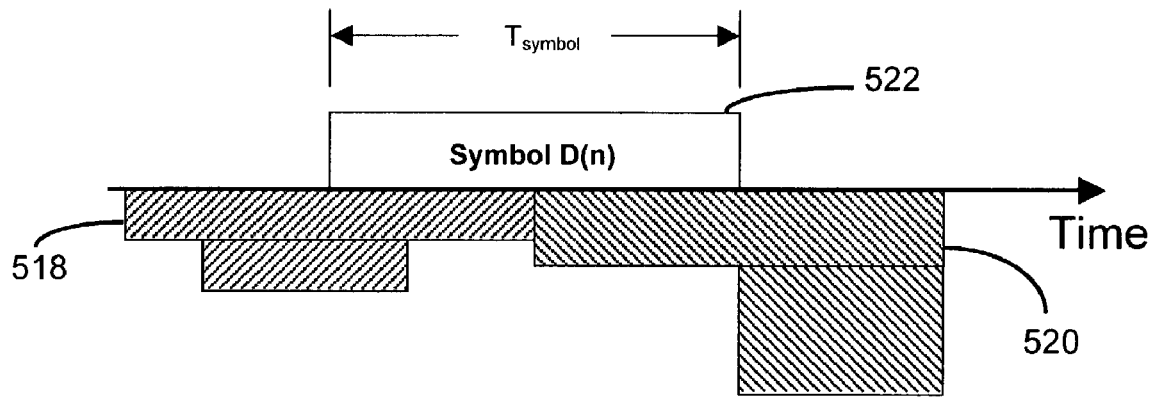

Similarly, in certain circumstances, it may be advantageous to implement equalization circuitry that produces a relative tap timing and amplitude relationship as illustrated in FIG. 9F. In this regard, a second tap of leading taps 502 and a second tap of trailing taps 504 may provide additional equalization signal to address pre-cursor and post-cursor distortions that exhibit consideration variation. The pulse duration of equalization signal generated by the second taps of the leading and trailing taps are shorter than that of the first taps. As such, the correction signals produced by the leading and trailing taps 502 and 504 of the equalization circuitry may address large variations of pre-cursor and post-cursor distortions. These variations may enhance the ability of the receiver to repeatedly recover the transmitted signal.

It should be noted that the timing response of FIG. 9F may be generated using the topology of FIG. 5B.

With reference to FIG. 10A, in one embodiment of the present invention, the equalization circuitry 500 may include temporal adjustment circuitry 600, amplitude adjustment circuitry 700, and summation and transmission circuitry 800. The temporal adjustment circuitry 600 is designed to provide or create, among other things, the selected timing relationship between the pre-equalized data signal, leading tap signal and the trailing tap signal. In this regard, the temporal adjustment circuitry receives leading tap input 602, trailing tap input 604 and data (i.e., symbol) input 606. Each input is applied to a corresponding shift register, which is selectively clocked to generate the selected or desired timing relationships between the equalization signals and the symbol (i.e., the pre-equalized data signal). It should be noted that, in this embodiment, leading tap input 602, trailing tap input 604 and data input 606 are the same signal.

With continued reference to FIG. 10A, in particular, shift register 608 receives leading tap input 602 and, in response to the timing signal $\phi_1$, outputs a delayed and temporally aligned version of input 602. Similarly, shift register 610 receives trailing tap input 604 and, in response to the timing signal $\phi_3$, outputs a delayed temporally aligned version of input 604. Shift register 612 receives the symbol or pre-equalized signal and, in response to the timing signal $\phi_2$, outputs a delayed and temporally aligned version of input 606. The signals output by the shift registers are precisely aligned relative to each other.

It should be noted that one, some or all of shift register 608, 610, and 612 may be comprised of a set or group of parallel latches (the number in the set or group being equal to the number of digital inputs 602, 604, and 606). In addition, one, some or all of shift register 608, 610, and 612 may be comprised a plurality of cascaded sets or groups of parallel latches (the number of latches in each set or group being equal to the number of digital inputs 602, 604, and 606) in order to introduce a "fixed" delay (i.e., the delay through the set(s) or group(s) of parallel latches) of the signals relative to the other shift registers. Thus, in this embodiment, the relative delay of input signals 602, 604 and 606 introduced by the shift registers and timing unit is equal to the delay introduced by the design of the respective shift registers and the differences in phases/delays between timing signals $\phi_1$, $\phi_2$, and $\phi_3$.

Moreover, other circuitry, for example, flip/flops and/or pass gates (whose gate electrodes are coupled to the timing signals from timing unit 900), may be implemented to provide a delayed and temporally aligned version of an input. Indeed, any digital delay element having a controllable delay, whether now know or later developed, may be implemented in the present invention to delay and temporally align the symbol and equalization signals.

With continued reference to FIG. 10A, the timing unit 900 provides a plurality of timing or clock signals having highly precise phase (and frequency) relationships. The timing unit 900 may be well known clock alignment circuitry, for example, delay locked loop circuitry or phase locked loop circuitry. As such, a highly precise phase (and frequency) relationship between data input 606 and leading and trailing tap inputs 602 and 604, respectively, may be sustained during operation of the system and over a wide operating environment.

It should be noted that other clock alignment circuitry may also be employed. Indeed, any clock alignment circuitry that outputs a plurality of clock signals having highly precise and constant phase (and frequency) relationships, whether now know or later developed, may be implemented in the present invention.

The temporal adjustment circuitry 600 and timing unit 900 may also provide a predetermined and/or programmable relationship between the duration of the leading tap signal, the trailing tap signal, and/or the pre-equalized data signal (i.e., symbol). In this regard, in one embodiment, the clock signals used to clock the shift registers may be selected to provide a predetermined and/or programmable relationship between the signals. For example, the period of timing signal $\phi_1$ may control the period or duration of leading tap signal 602. In this way, a precise period or duration of the leading tap signal (relative to the pre-equalized signal and/or trailing tap signal) may be selected to provide a desired amount of pre-cursor equalization.

Similarly, the period of timing signal $\phi_2$ may control the period or duration of trailing tap signal 604. Thus, a precise duration of the trailing tap signal (relative to the pre-equalized signal and/or leading tap signal) may be selected to provide a desired amount of post-cursor equalization.

Moreover, the period of the leading and trailing tap signals 602 and 604 may be programmed or controlled independently. That is, each tap signal may be programmed to a unique or different period or duration. In this way, the communication system has a considerable degree of flexibility in addressing pre-cursor and post-cursor distortions.

With continued reference to FIG. 10A, the amplitude adjustment circuitry 700 is designed to provide predetermined and/or programmable adjustment of the amplitude of the leading and trailing tap signals in relation to the transmitted signal ($A_{xmit}$). In this regard, multiplying digital to analog converters ("MDACs") 702 and 704 convert the tap coefficients $C_{lead}$ and $C_{trail}$ into analog representations thereof. The MDACs 702 and 704 use the analog representation of the transmit amplitude control ($A_{xmit}$) as a reference current to provide appropriate scaling.

The appropriately scaled analog representations of tap coefficients $C_{lead}$ and $C_{trail}$ are provided to the summation and transmission circuitry 800. In particular, MDACs 702 and 704 convert the digital $C_{lead}$ and $C_{trail}$ tap coefficients into a current to drive for MDACs 808 and 814, respectively, in summation and transmission circuitry 800. The resolution of MDACs 702 and 704 may be selected according to the anticipated range of the leading and trailing coefficients. In this regard, in certain environments, the amplitude of the equalization signal of the trailing tap(s) may be larger than that of the leading tap(s) in order to address disproportionate post-cursor dispersion. Accordingly, it may be advantageous to employ a higher resolution DAC to convert the trailing coefficient.

As mentioned above, the leading and trailing taps provide intentional corrective intersymbol interference. Thus, as the coefficients of the leading and trailing taps are varied to provide enhanced or optimum system performance, the peak amplitude of the transmitted signal will also vary. Accordingly, it may be advantageous to incorporate an additional "control loop" to limit, minimize or prevent overdriving the transmitter output in response to variations of the leading and trailing tap coefficients and thereby prevent clipping of the signal at the transmitter output.

With continued reference to FIG. 10A, in a preferred embodiment, replica current(s) from coefficient MDACs 702 and 704 are compared to the reference current to generate the transmitter output current level. In one embodiment, this may also be the reference level for all symbol and coefficient DACs 702, 704 and 706. As such, for a given timing and range of coefficient taps, an algorithm may be implemented to prevent the clipping of the output signal.

It should be noted that there are many methods which may be utilized to provide an automatic gain control (AGC) technique, for example, the output of a peak detector may be compared to a reference signal (i.e., the maximum allowable transmit amplitude) and, using a standard control loop (e.g., a lossy-type integrator) a reference voltage may be determined for DAC 706. Indeed, all techniques to prevent clipping of the output as a result of varying the tap coefficients and varying the pulse overlapping of the taps and the symbol (as a result of the timing relationship of the correction taps relative to the transmitted symbol or data and/or the pulse durations of the equalization signals), whether now know or later developed, are intended to be within the scope of the invention.

The summation and transmission circuitry 800 is designed to sum the equalization signals and the pre-equalized data signal into an equalized data signal and output the equalized data signal (differential output 802) onto the communications channel, for example, a backplane. In this regard, summation and transmission circuitry 800 receives the temporally aligned leading tap, trailing tap, and data signals from temporal adjustment circuitry 600. Using the amplitude information from the amplitude adjustment circuitry 700, the summation and transmission circuitry 800 generates a differential output 802. In one embodiment, the transmitted signal (i.e., differential output 802) is generated via current summation and thereafter translated into a voltage using termination resistors 804.

In particular, the temporally aligned leading tap signal 806 is provided to MDAC 808. In response, MDAC 808 converts signal 806 to an analog representation thereof to produce leading tap signals 810a and 810b. The output of MDAC 702 provides the appropriate scaling of the leading tap correction (leading tap coefficient $C_{lead}$) by converting the leading tap coefficient $C_{lead}$ to an analog signal and providing that signal to MDAC 808. In one embodiment, MDAC 808 uses the analog representation of the leading tap coefficient $C_{lead}$ as the reference current to provide appropriate scaling based on the magnitude of coefficient $C_{lead}$.

Similarly, temporally aligned trailing tap signal 812 is provided to MDAC 814 to generate the leading tap signals 816a and 816b. The MDAC 820 receives the analog representation of the trailing tap coefficient (from MDAC 704) to introduce or implement the appropriate scaling of the trailing tap correction. In one embodiment, MDAC 814 uses the analog representation of the leading tap coefficient $C_{trail}$ as a reference current to provide appropriate scaling for MDAC 814 based on coefficient $C_{trail}$.

Finally, the temporally aligned data signal 818 is provided to MDAC 820 which converts the digital information to an analog representation thereof. In one embodiment, MDAC 820 uses the analog representation of the transmit amplitude control $A_{xmit}$ as a reference current to provide appropriate scaling. The analog representation is output on signal lines 822a and 822b.

As mentioned above, the outputs of the parallel combination of MDACs 808, 814 and 820 are summed via current summation and translated into a voltage signal using termination resistors 804 (see, for example, signal 528 in FIG. 8). The termination resistors 804 are employed as a current summation node. In this way, the output exhibits a low impedance and the bandwidth of the output is correspondingly high. While more than three taps may be implemented, increasing the number of taps may impact the bandwidth of the transmitter or the system due to parasitic capacitances introduced by the transmitter.

It should be noted that the embodiment illustrated in FIG. 10A may be well suited for implementing PAM-4 baseband transmission. In this regard, parallel current MDACs are employed to convert the binary data D(n) to PAM-4. However, by changing the configuration of the MDACs other baseband modulation schemes may be implemented, for example, a one-bit MDAC may be used for NRZ transmission scheme. In this regard, with reference to FIGS. 10B and 10C, under those circumstances where the transmission or encoding scheme is a multilevel pulse amplitude modulated (PAM-n) communications technique, MDACs 808, 814, and 820 may be n-level MDACs to accommodate that transmission or encoding scheme.

With continued reference to FIG. 10A, under those circumstances where the pulse duration of equalization signals changes (or is modified) to, for example, enhance or optimize the performance of the system, different pulse durations of leading tap input signals 602 and trailing tap input signal 604 may be provided by adjusting the period of timing signals $\phi_1$ and $\phi_3$. In this regard, a longer period (or larger pulse duration) may be obtained by applying timing signals to shift registers 608 and 610 that have a longer period. In this way, the value that resides in the shift registers is maintained in those registers for a longer period of time relative to symbol or data signal 606. Notably, the timing signals $\phi_1$ and $\phi_3$ will maintain a precise phase relationship with respect to timing signal $\phi_2$ regardless of changes or variations in the period(s) of $\phi_1$ and $\phi_3$.

Similarly, by selecting and applying timing signals $\phi_1$ and $\phi_3$ that have a shorter period (or shorter pulse duration), the equalization signals will have a shorter period relative to symbol or data signal 606. In this way, the value that resides in the shift registers is clocked-out of the registers more quickly (relative to symbol or data signal 606) and the digital information (i.e., 806 and 812) provided to MDACs 808 and 814 changes accordingly so that the lengths of correction signals are shorter (compare, for example, FIGS. 9A and 9B).

The appropriate timing signals may be provided by timing unit 900 and may be selected or programmed based on the considerations described above. That is, in one embodiment, the pulse durations of the tap(s) are adjusted or controlled during operation of the transmitter, for example using an adaptive algorithm, as described above. In another embodiment, the adjustment or control may be by user programming (either before or during operation of the transmitter). The pulse durations of the tap(s) may, in another embodiment, be pre-programmed or pre-set, for example, by permanently, semi-permanently or temporarily (i.e., until re-programmed) storing information representative of the pulse durations of the tap(s) in an SRAM, DRAM, ROM, PROM, EPROM, EEPROM or the like. The pre-programmed or pre-set pulse durations of the tap(s) may thereafter be fine-tuned to enhance the system performance.

Figure 10B:
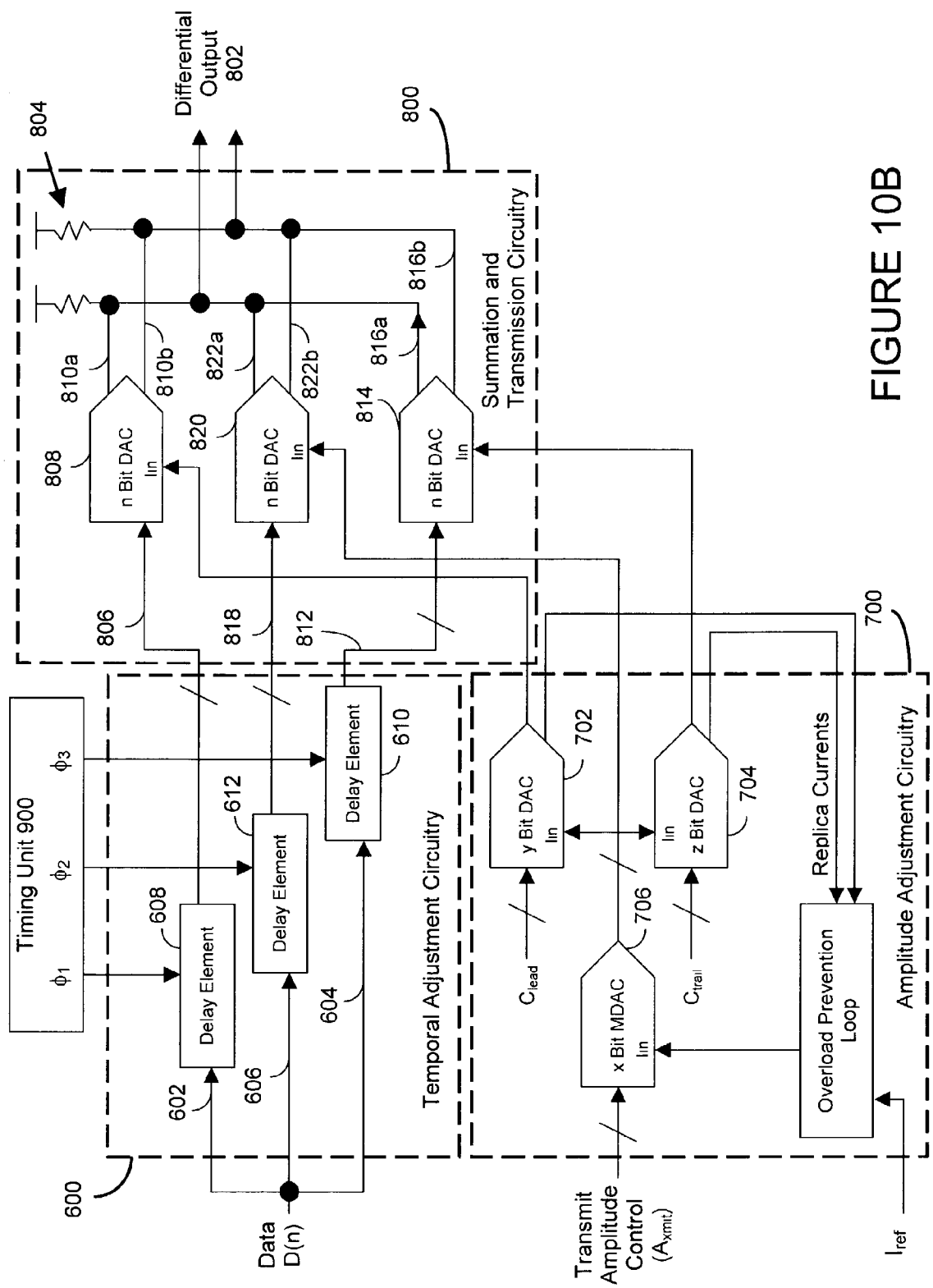
Figure 10C:
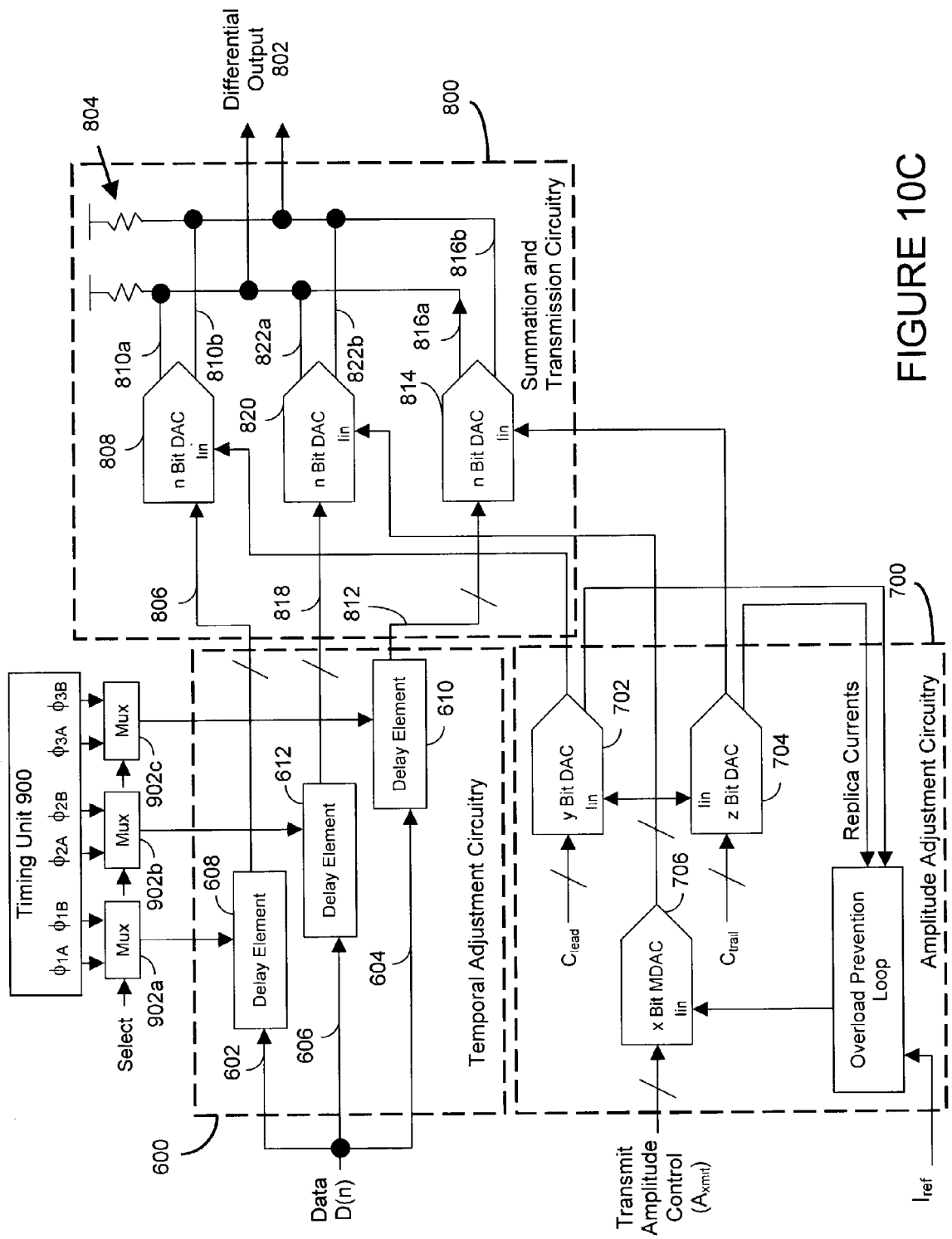

It should be noted that there are many techniques for generating equalized data signal 802. For example, the summation of the equalization signals and the data signal (symbol) may be performed before converting the digital signals to analog representations. Under this circumstance, one DAC may be employed rather than three as illustrated in FIGS. 10A, 10B and 10C.

Figure 11A:
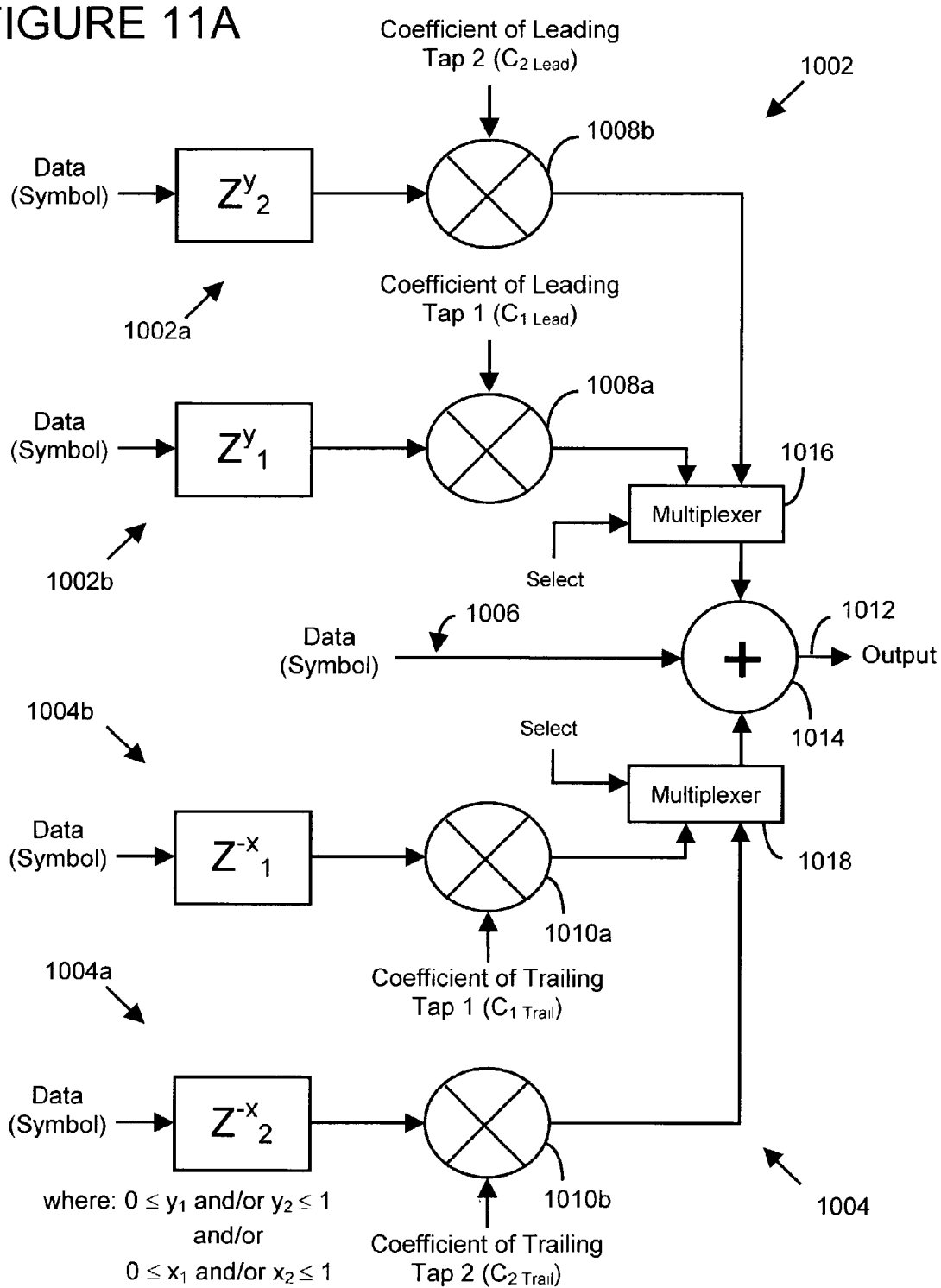
FIGS. 11A and 11B are block diagram representations of another embodiment of the present invention including a plurality of selectable tap topologies/responses of equalization circuitry in accordance with certain aspects of the present invention.
Figure 11B:
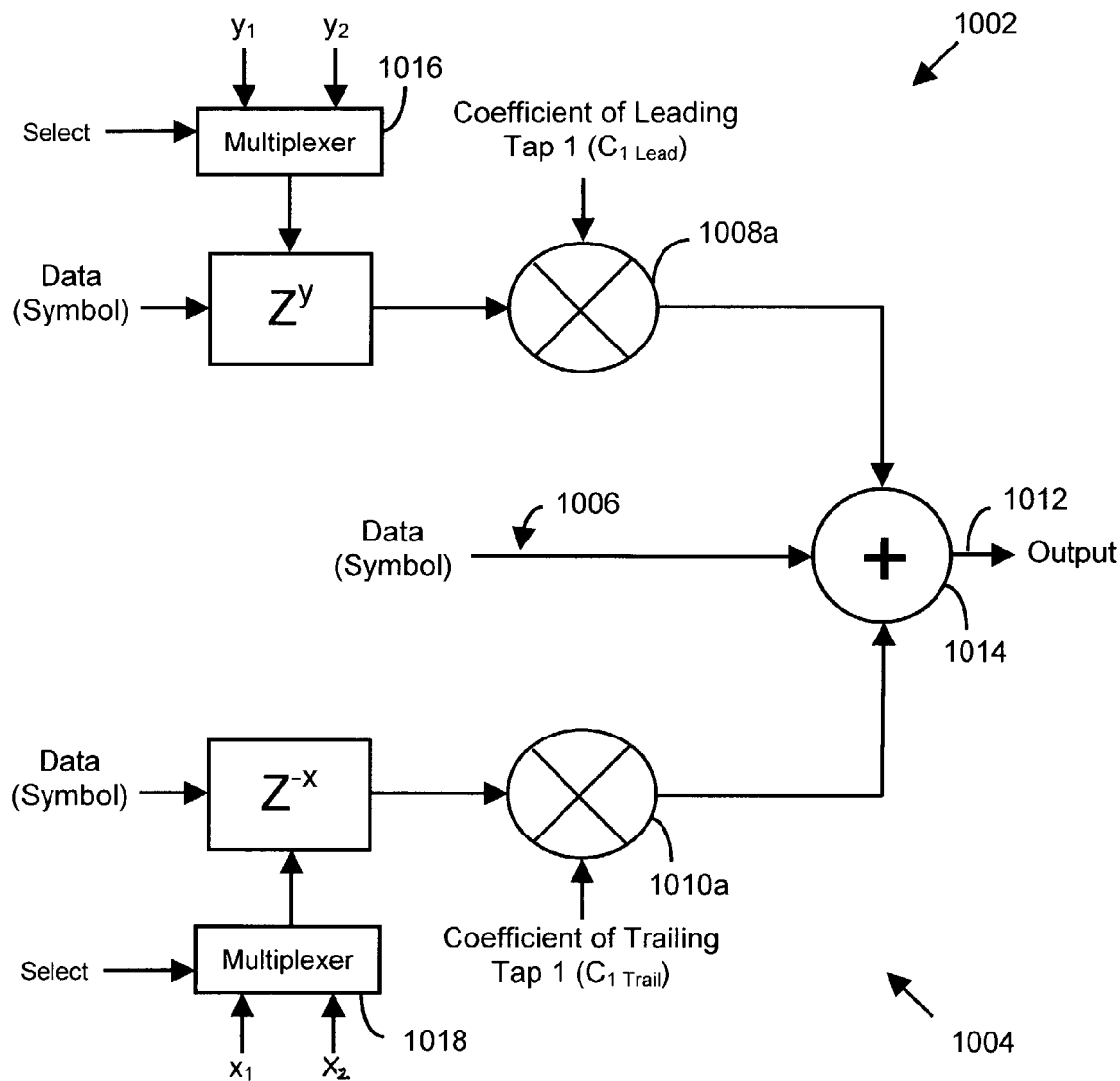

With reference to FIGS. 11A and 11B, in another embodiment of the present invention, a plurality of topologies of the equalization circuitry may be predetermined, preset or pre-programmed and selection of the topology to be implement by the equalization circuitry may be made, for example, at start-up/power-up or may be made during installation of the system (via hardwiring a pin on the package to a given state). In this embodiment, the plurality of topologies may have: (1) predetermined, preset or preprogrammed timing relationships of the correction taps relative to the transmitted symbol (data signal), (2) predetermined, preset or pre-programmed tap coefficients, and/or (3) predetermined, pre-set or pre-programmed pulse durations of the equalization signals. A given topology of the plurality of topologies may be selected by the user according to, for example, an anticipated response of the system based on the communications environment. In this way, certain aspects of the complexity may be reduced or eliminated.

With reference to FIG. 11A, in one embodiment, leading taps 1002 may include two tap paths 1002a and 1002b (each path may have one or more taps). The selection of leading tap path 1002a or 1002b, and as such the leading tap path to be incorporated into the equalization process, is made by multiplexer 1016. It should be noted that leading taps 1002 may include more than just two tap paths.

Similarly, trailing taps 1004 may include two tap paths 1004a and 1004b (each path may have one or more taps). The selection of leading tap path 1004a or 1004b, and as such the trailing tap path to be incorporated into the equalization process, is made by multiplexer 1018. As with the leading taps, trailing taps 1004 may include more than just two tap paths.

In one embodiment, for example, first leading tap path 1002a and trailing tap path 1004a may provide a tap timing, amplitude (coefficient), and pulse width relationship according to FIG. 7 or FIG. 9A. A second leading tap path 1002b and trailing tap path 1004b may provide a tap timing, amplitude (coefficient), and pulse width relationship according to FIG. 9B or FIG. 9C.

With reference to FIG. 11B, the selection of the topologies is implemented using multiplexers 1016 and 1018. Here, however, the tap timing(s) of leading and trailing taps 1002 and 1004 are controlled by the multiplexers. This embodiment may be implemented in a manner according to FIG. 10C. In this regard, multiplexers 1016 and 1018 of FIG. 11B are represented by multiplexers 902a and 902c of FIG. 10C. Multiplexer 902b incorporates more flexibility into system 10 in that all three taps may be temporally adjusted.

With continued reference to FIG. 11B, the topologies of the leading and trailing taps may or may not include intersymbol interference (i.e., temporal overlap of the equalization signals with the data (symbol) signal). For example, a first topology may include $y_1$ and $x_1$ that are equal to about ½ or ¾. A second topology may include $y_2$ and/or $x_2$ that are greater than or equal to about 1. Thus, while the first topology includes temporal overlap between the leading/trailing taps and the data signal (symbol) (as illustrated in, for example, FIGS. 7, 9A and 9B), the second topology will include no temporal overlap or only the leading or trailing tap will temporally overlap.

The user or system may select between the predetermined equalization effects (via multiplexers 1016 and 1018 and select signals) at installation (via configuring the state of a certain pin or pins on the package), after start-up/power-up, during an initialization sequence or a re-initialization sequence, or during operation. The predetermined, preset or pre-programmed parameters of the taps may be "hardwired" permanently, semi-permanently or temporarily (i.e., until re-programmed) by way of a DRAM, SRAM, ROM, PROM, EPROM, EEPROM or the like (e.g., configuring the state of a certain pin or pins on the package).

In one embodiment, a register on the transmitter may be programmed to store information representative of the selected leading and/or trailing tap paths. The register may be programmed or accessed after start-up/power-up, during an initialization sequence or a re-initialization sequence, or during operation. In this embodiment, the selection of the tap paths to be implemented in the equalization process may be made by the user or the system, via programming of the register, according to, for example, a given or anticipated response of the communications channel. In this regard, a given tap path may be advantageous in systems that experience or observe considerable jitter of the clock and/or data signals or in systems that experience or observe considerable crosstalk between signal lines. As such, the selected response of the equalization circuitry may be implemented via programming of a discrete register or a register that may reside on the integrated circuit containing the transmitter (and the equalization circuitry).

In one embodiment, the parameters of the taps may also be fine tuned to enhance the system performance. In this regard, after (or during) the performance of an initialization or re-initialization process, the system may implement fine adjustments to the predetermined, preset or pre-programmed timing relationships of the correction taps, tap coefficients, and/or pulse durations of the equalization signals. The fine adjustments to these parameters may be accomplished using any of the techniques described above. Indeed, all techniques for determining these parameters, whether now known or later developed, are intended to be within the scope of the present invention.

Thus, in one embodiment of this aspect of the present invention, a first path of the leading and/or trailing taps may be "turned off" or disabled and another leading and/or trailing tap path may be "turned on" or enabled quite rapidly. In this embodiment, the system need not determine the initial parameters (or some of the initial parameters) of the tap paths because such parameters may be stored in, for example, a DRAM, SRAM, ROM or EPROM. As such, the time delay in implementing a new equalization response or effect may be reduced and the system may become operational more rapidly.

It should be noted that more than two leading tap paths and/or two trailing tap paths may be implemented. Indeed, the equalization circuitry may include as many leading and/or trailing tap paths as desired. In each of such tap paths, the taps may include a predetermined, preset or pre-programmed timing relationship, coefficients, and/or pulse durations. The user or system may then select from the plurality of tap paths which provides a given, desired or appropriate response.

The system according to one aspect of the present invention includes leading and/or trailing tap(s) to provide intentional corrective intersymbol interference to reduce, minimize, mitigate or effectively eliminate pre-cursor and/or post-cursor intersymbol interference due to, for example, bandwidth limitations and reflections in high-speed digital communication systems. The amount of intersymbol interference correction designed into the equalization topology is controlled or determined by the timing relationship of the correction taps relative to the transmitted symbol or data, the coefficients of the taps, and/or the pulse durations of the equalization signals.

The equalization structure and techniques of the present invention are incorporated into the transmitter. As mentioned above, implementing the equalization circuitry and technique of the present invention at the transmitter may have an advantage in that it includes an IIR like-equalization component (a group delay response) created by the impulse response of the communications channel. The leader and/or trailer taps of the equalization circuitry are adjustable "corrections" applied to the transmitted symbol. These "correction" pulses are dispersed in the same manner that the transmitted symbol is dispersed by the impulse response of the channel. This effect may reduce or minimize the number of taps required to achieve a desired response and thereby improve or enhance the bandwidth of the transmitter output and the overall performance of the system.

There are many inventions described and illustrated herein. While certain embodiments, features, attributes and advantages of the inventions have been described and illustrated, it should be understood that many other, as well as different, embodiments, features, attributes and advantages of the present inventions that are apparent from the description, illustration and claims. As such, the embodiments, features, attributes and advantages of the inventions described and illustrated herein are not exhaustive and it should be understood that such other, as well as different, embodiments, features, attributes and advantages of the present inventions are within the scope of the present invention.

For example, the present invention may be implemented using more than three taps (See, for example, FIG. 5B).

Indeed, some of the taps need not overlap but may be conventional type taps that have no overlap with the symbol or data signal and, as such, introduce no intentional intersymbol interference at the transmitter (see, for example, FIGS. 12C, 12D, 12E and 12F). Thus, the present invention may be a combination of overlapping and non-overlapping taps.

Figure 12A:
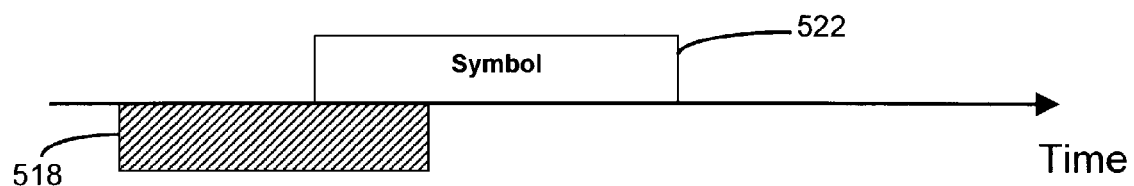
FIGS. 12A, 12B, 12C, 12D, 12E, 12F, 12G, and 12H are illustrations of exemplary tap timing and pulse width relationships, in relation to the data signal (i.e., symbol), according to certain aspects of the present invention.
Figure 12B:
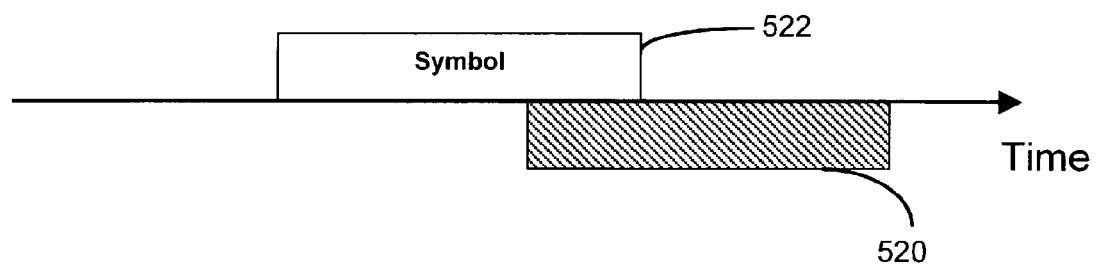
Figure 12C:
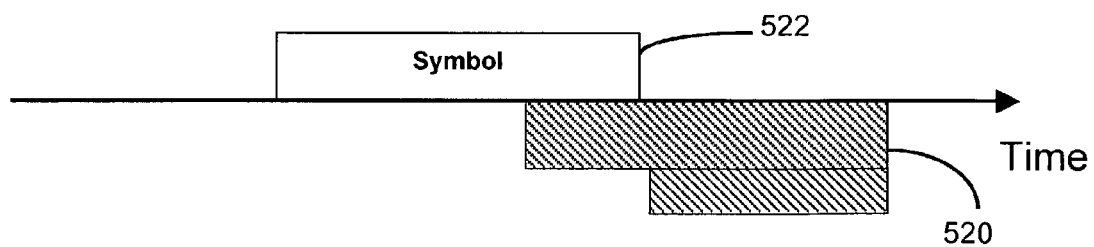
Figure 12D:
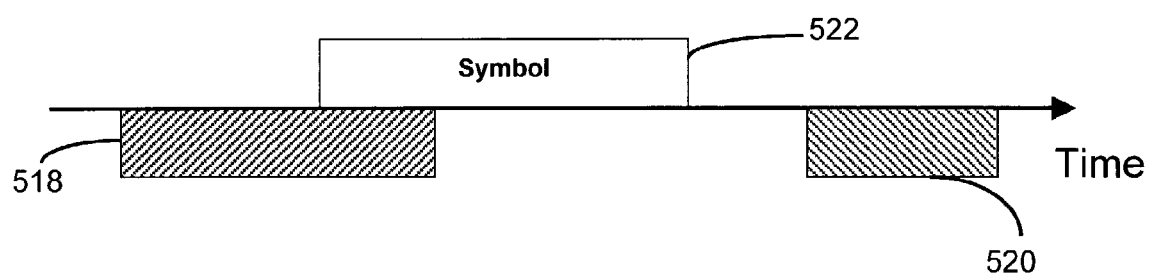
Figure 12E:
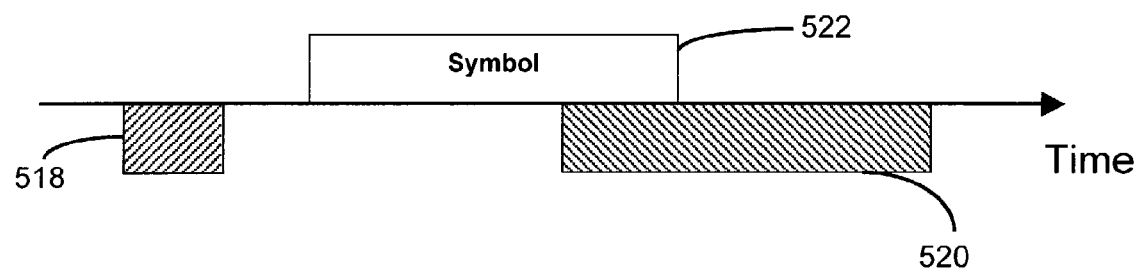
Figure 12F:
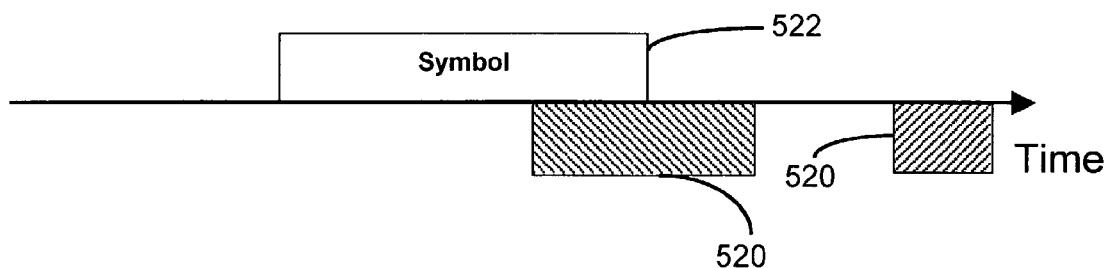

Moreover, the present invention may be implemented using only leading tap(s) (see, for example, FIG. 12A), or trailing tap(s) (see, for example, FIGS. 12B and 12C), or as described above, using leading and trailing tap(s)(see, for example, FIGS. 5A, 5B, 6 and 11). Indeed, the present invention may be implemented using overlapping leading tap(s) or trailing tap(s) and non-overlapping leading and/or trailing tap(s) (see, for example, FIGS. 12D, 12E and 12F). Other permutations of leading and trailing taps are suitable and are contemplated. As such, all permutations of leading and/or trailing taps having at least one tap that introduces intersymbol interference are intended to fall within the scope of the present invention.

Figure 12G:
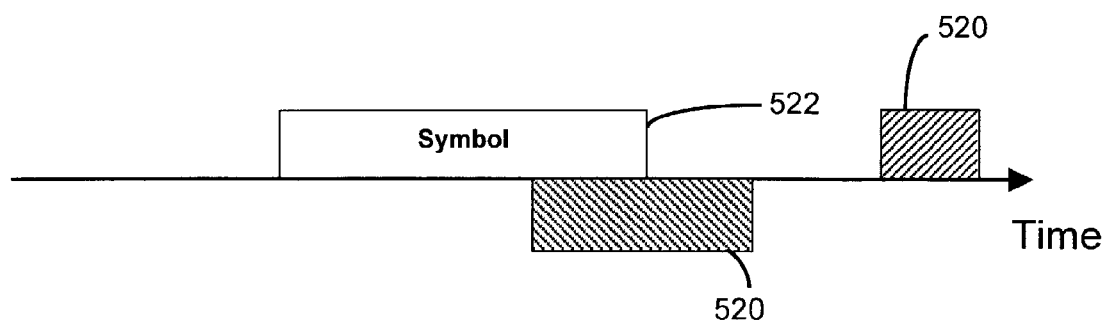
Figure 12H:
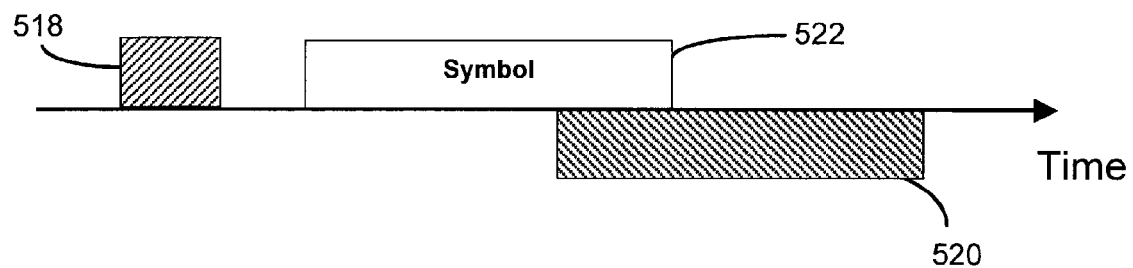

In addition, the present invention may be implemented with taps having coefficients that are either positive or negative (i.e., digital $C_{lead}$ and $C_{trail}$ tap coefficients may be either positive or negative). As such, the taps may be programmed or configured to add or subtract energy from the transmitted pulse. For example, in certain communications environments, there may be a reflection at a given frequency due to a known or predetermined impedance mismatches. In that circumstance, it may be advantageous to include a digital $C_{trail}$ tap coefficient that is positive and, as such, adds energy to compensate or address the reflection (See for example, FIG. 12G). Similarly, in certain circumstances, it may be advantageous to include a digital $C_{lead}$ tap coefficient that is positive and, as such, adds energy to compensate or address an unwanted response of the system (See for example, FIG. 12H).

Further, while in certain respects the present invention has been described in the context of an analog FIR filter having one or more taps positioned before and/or after the transmitted symbol, the present invention may be implemented using other types of equalization circuitry, for example, IIR filters.

In addition, while certain of the figures have illustrated the signals as pulse or square shaped signals, those illustrations should not be taken as limiting. Indeed, any shaped signals may be appropriate and the pulse shape of the equalization signal(s) is programmable or controllable so that the energy content of the equalization signals may be modified to provide the system additional flexibility in reducing, minimizing, mitigating or effectively eliminating pre-cursor and/or post-cursor intersymbol interference.

Further, it should be noted that communications channel 300 described herein may be, for example, constructed using one or more cables, wires, traces or the like, or may be part of a backplane, or may be a wireless communications medium through which the signal passes from transmitter 100 to receiver 200. One skilled in the art will recognize that any such communications media, when used in conjunction with a corresponding transmitter/receiver pair appropriate for a particular medium, may be used to construct a communications channel in accordance with the present invention.

For example, other channels that may be implemented in the present invention include electronic, optical or wireless. Indeed, all types of channels of communication (i.e., communication channels), whether now known or later developed are intended to fall within the scope of the present invention.

In addition, it should be noted that other types of digital to analog converters may be implemented in the present invention. Indeed, any digital to analog converters, whether now know or later developed, may be implemented in the present invention to convert digital signals to an analog representation thereof.

It should be further noted that the term "circuit" may mean either a single component or a multiplicity of components, either active and/or passive, which are coupled together to provide or perform a desired function. The term "circuitry" may mean a circuit (whether integrated or otherwise), a group of such circuits, a processor(s), a processor(s) implementing software, or a combination of a circuit (whether integrated or otherwise), a group of such circuits, a processor(s) and/or a processor(s) implementing software. The term "signal" may mean a current or voltage signal whether in an analog or a digital form.

What is claimed is:

1. A system for providing data communication over a communications channel, wherein the communications channel includes a backplane, the system comprising:
   a first transmitter coupled to the communications channel, the first transmitter includes equalization circuitry having at least one leading tap and at least one trailing tap wherein the at least one leading tap and the at least one trailing tap provide equalization signals that temporally overlap with a data signal and wherein the first transmitter outputs an equalized data signal; and
   a first receiver, coupled to the communications channel, to receive the equalized data signal.

2. The system of claim 1 wherein the leading taps and the trailing taps of the equalization circuitry include programmable coefficients.

3. The system of claim 1 wherein the leading taps and the trailing taps of the equalization circuitry include programmable positioning.

4. The system of claim 1 wherein the leading taps and the trailing taps of the equalization circuitry includes programmable coefficients and positioning.

5. The system of claim 1 wherein the first transmitter uses a PAM-4 communication technique.

6. The system of claim 1 wherein the leading taps and the trailing taps of the equalization circuitry include programmable coefficients and wherein information which is representative of the programmable coefficients is provided to the system using an external interface.

7. A system for providing data communication over a communications channel, wherein the communications channel includes a backplane, the system comprising:
   a first transmitter coupled to the communications channel, the transmitter includes equalization circuitry having a first trailing tap that provides an equalization signal that temporally overlaps with a data signal, wherein the transmitter generates an equalized data signal using the equalization signal and the data signal; and
   a first receiver, coupled to the communications channel, to receive the equalized data signal.

8. The system of claim 7 wherein the first trailing tap of the equalization circuitry includes a programmable coefficient.

9. The system of claim 7 wherein the first trailing tap of the equalization circuitry includes a programmable position.

10. The system of claim 7 wherein the first transmitter uses a PAM-4 communication technique.

11. The system of claim 7 wherein the first trailing tap of the equalization circuitry includes a programmable coefficient and a programmable position.

12. The system of claim 7 wherein the first trailing tap of the equalization circuitry includes programmable coefficient and wherein information which is representative of the programmable coefficient is provided to the system using an external interface.

13. The system of claim 7 wherein the equalization circuitry further includes a leading tap wherein the leading tap provides an equalization signal that temporally overlaps with a data signal, and wherein the transmitter generates an equalized data signal using the equalization signal provided by the leading tap, the equalization signals provided by the first and second trailing taps, and the data signal.

14. A method for equalization of data signals that are transmitted over a communications channel, wherein the communications channel includes a backplane, the method comprising:

generating a first equalization signal using a leading tap wherein the first equalization signal temporally overlaps with a data signal;

generating a second equalization signal using a first trailing tap wherein the second equalization signal temporally overlaps with the data signal;

generating an equalized data signal using the first and second equalization signals with the data signal; and transmitting the equalized data signal.

15. The method of claim 14 wherein the step of transmitting uses a PAM-4 communication technique.

16. The method of claim 14 further including controlling the second equalization signal by controlling the position of the trailing tap.

17. The method of claim 14 further including controlling the second equalization signal by controlling the coefficient of the trailing tap.

18. The method of claim 14 further including controlling the first equalization signal by controlling the coefficient of the leading tap.

* * * * *